(12) United States Patent
Shwartsman et al.

(10) Patent No.: US 9,558,127 B2
(45) Date of Patent: Jan. 31, 2017

(54) INSTRUCTION AND LOGIC FOR A CACHE PREFETCHER AND DATALESS FILL BUFFER

(71) Applicant: Intel Corporation, Santa Clara, CA (US)

(72) Inventors: Stanislav Shwartsman, Haifa (IL); Robert S. Chappell, Portland, OR (US); Ronak Singhal, Portland, OR (US); Ryan L. Carlson, Hillsboro, OR (US); Raanan Sade, Kibutz Gvat (IL); Omar M. Shaikh, Portland, OR (US); Liron Zur, Haifa (IL); Yiftach Gilad, Givat Ada (IL)

(73) Assignee: Intel Corporation, Santa Clara, CA (US)

( * ) Notice: Subject to any disclaimer, the term of this patent is extended or adjusted under 35 U.S.C. 154(b) by 221 days.

(21) Appl. No.: 14/481,266

(22) Filed: Sep. 9, 2014

(65) Prior Publication Data

US 2016/0070651 A1    Mar. 10, 2016

(51) Int. Cl.
*G06F 12/08* (2016.01)

(52) U.S. Cl.
CPC ....... *G06F 12/0897* (2013.01); *G06F 12/0862* (2013.01); *G06F 2212/1021* (2013.01); *G06F 2212/402* (2013.01); *G06F 2212/602* (2013.01)

(58) Field of Classification Search
None
See application file for complete search history.

(56) References Cited

U.S. PATENT DOCUMENTS

| | | | | |
|---|---|---|---|---|
| 5,603,004 A * | 2/1997 | Kurpanek | ........... | G06F 12/0864 711/118 |
| 6,643,745 B1 * | 11/2003 | Palanca | ................... | G06F 9/383 711/137 |
| 2014/0129772 A1 * | 5/2014 | Kalamatianos | ..... | G06F 12/0897 711/119 |

* cited by examiner

*Primary Examiner* — Denise Tran
(74) *Attorney, Agent, or Firm* — Baker Botts L.L.P.

(57) ABSTRACT

A processor includes a cache hierarchy and an execution unit. The cache hierarchy includes a lower level cache and a higher level cache. The execution unit includes logic to issue a memory operation to access the cache hierarchy. The lower level cache includes logic to determine that a requested cache line of the memory operation is unavailable in the lower level cache, determine that a line fill buffer of the lower level cache is full, and initiate prefetching of the requested cache line from the higher level cache based upon the determination that the line fill buffer of the lower level cache is full. The line fill buffer is to forward miss requests to the higher level cache.

17 Claims, 17 Drawing Sheets

INSTRUCTION AND LOGIC FOR A CACHE PREFETCHER AND DATALESS FILL BUFFER

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Multiprocessor systems are becoming more and more common. Applications of multiprocessor systems include dynamic domain partitioning all the way down to desktop computing. In order to take advantage of multiprocessor systems, code to be executed may be separated into multiple threads for execution by various processing entities. Each thread may be executed in parallel with one another.

Choosing cryptographic routines may include choosing trade-offs between security and resources necessary to implement the routine. While some cryptographic routines are not as secure as others, the resources necessary to implement them may be small enough to enable their use in a variety of applications where computing resources, such as processing power and memory, are less available than, for example, a desktop computer or larger computing scheme. The cost of implementing routines such as cryptographic routines may be measured in gate counts or gate-equivalent counts, throughput, power consumption, or production cost. Several cryptographic routines for use in computing applications include those known as AES, Hight, Iceberg, Katan, Klein, Led, mCrypton, Piccolo, Present, Prince, Twine, and EPCBC, though these routines are not necessarily compatible with each other, nor may one routine necessarily substitute for another.

DESCRIPTION OF THE FIGURES

Embodiments are illustrated by way of example and not limitation in the Figures of the accompanying drawings.

DETAILED DESCRIPTION

Figure 1A:
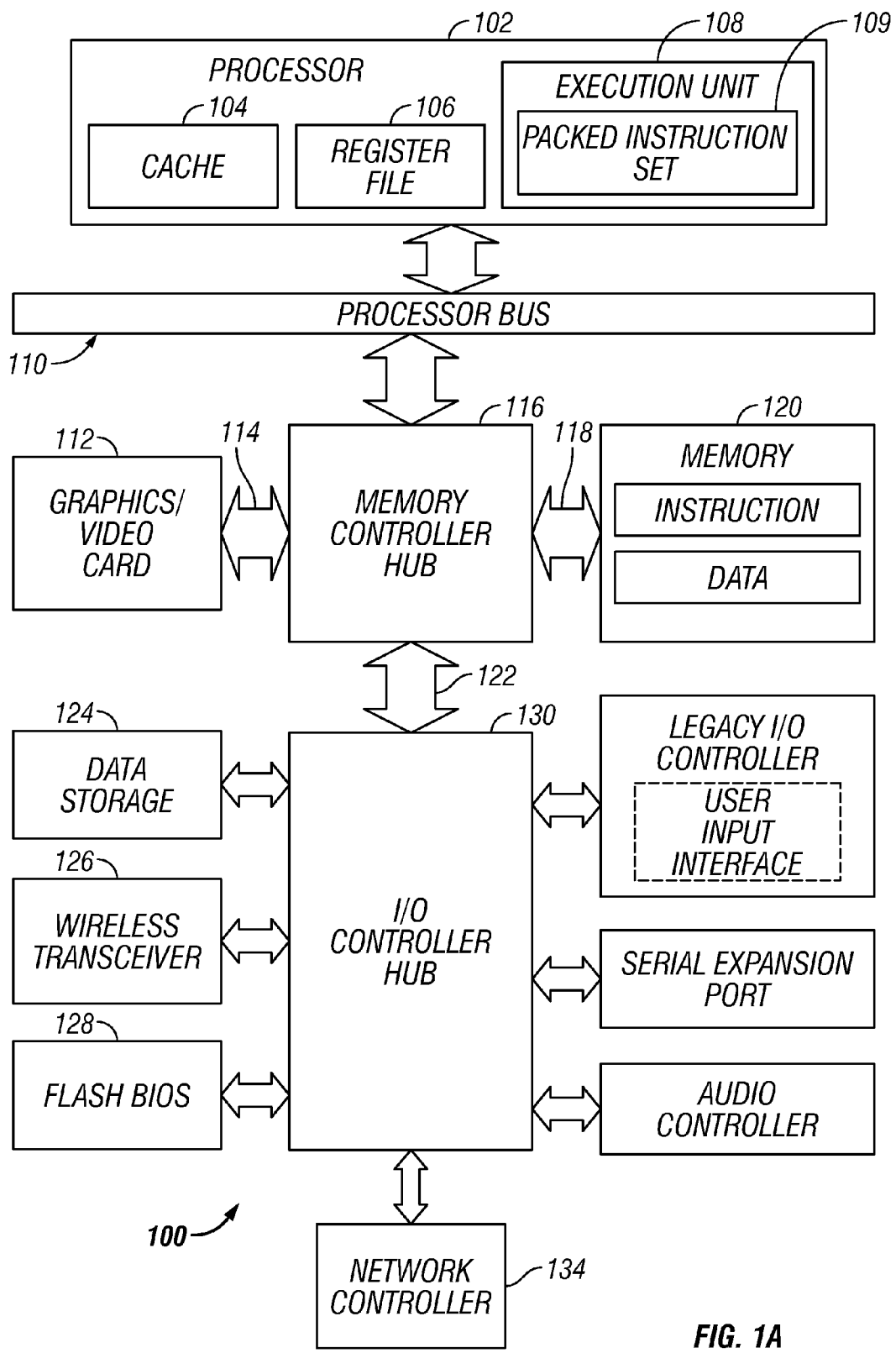
FIG. 1A is a block diagram of an exemplary computer system formed with a processor that may include execution units to execute an instruction, in accordance with embodiments of the present disclosure.

The following description describes an instruction and processing logic for a cache prefetcher. Furthermore, the following description describes an instruction and processing logic for a dataless fill buffer for use in conjunction with the cache prefetcher. These may be used within or in association with a processor, virtual processor, package, computer system, or other processing apparatus. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that the embodiments may be practiced without such specific details. Additionally, some well-known structures, circuits, and the like have not been shown in detail to avoid unnecessarily obscuring embodiments of the present disclosure.

Although the following embodiments are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that may be programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, steps of embodiments of the present disclosure might be performed by specific hardware components that contain fixed-function logic for performing the steps, or by any combination of programmed computer components and fixed-function hardware components.

Instructions used to program logic to perform embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Discs, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion of a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT)), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with embodiments of the present disclosure. System 100 may include a component, such as a processor 102 to employ execution units including logic to perform algorithms for process data, in accordance with the present disclosure, such as in the embodiment described herein. System 100 may be representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including logic to perform integer and floating point operations, also resides in processor 102. Processor 102 may also include a microcode (ucode) ROM that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Embodiments of an execution unit 108 may also be used in micro controllers, embedded processors, graphics devices, DSPs, and other types of logic circuits. System 100 may include a memory 120. Memory 120 may be implemented as a Dynamic Random Access Memory (DRAM) device, a Static Random Access Memory (SRAM) device, flash memory device, or other memory device. Memory 120 may store instructions and/or data represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for instruction and data storage and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. Data storage device 124 may comprise a hard disk drive, a floppy disk drive, a CD-ROM device, a flash memory device, or other mass storage device.

For another embodiment of a system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
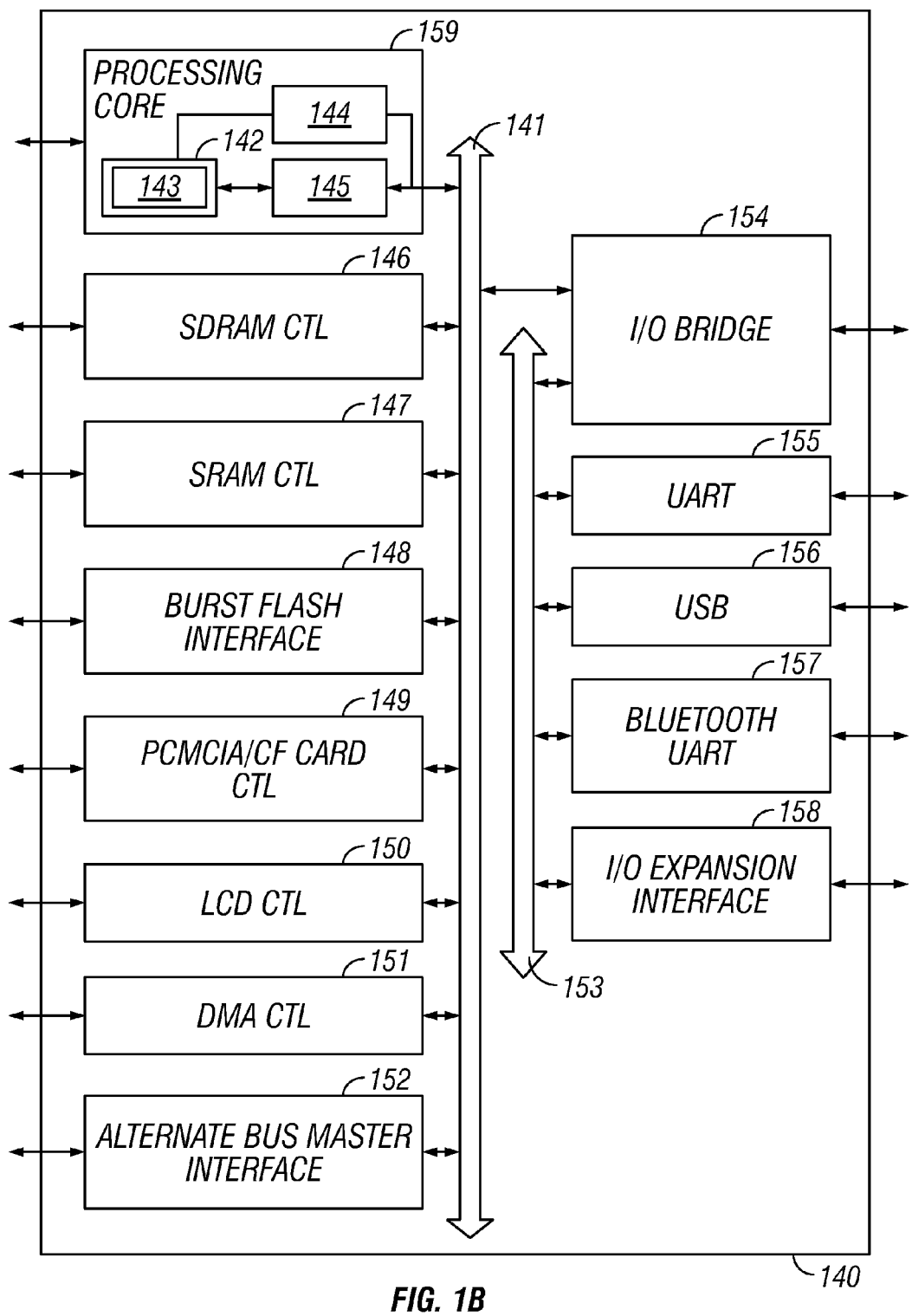
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW-type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, Synchronous Dynamic Random Access Memory (SDRAM) control 146, Static Random Access Memory (SRAM) control 147, burst flash memory interface 148, Personal Computer Memory Card International Association (PCMCIA)/Compact Flash (CF) card control 149, Liquid Crystal Display (LCD) control 150, Direct Memory Access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, Universal Asynchronous Receiver/Transmitter (UART) 155, Universal Serial Bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
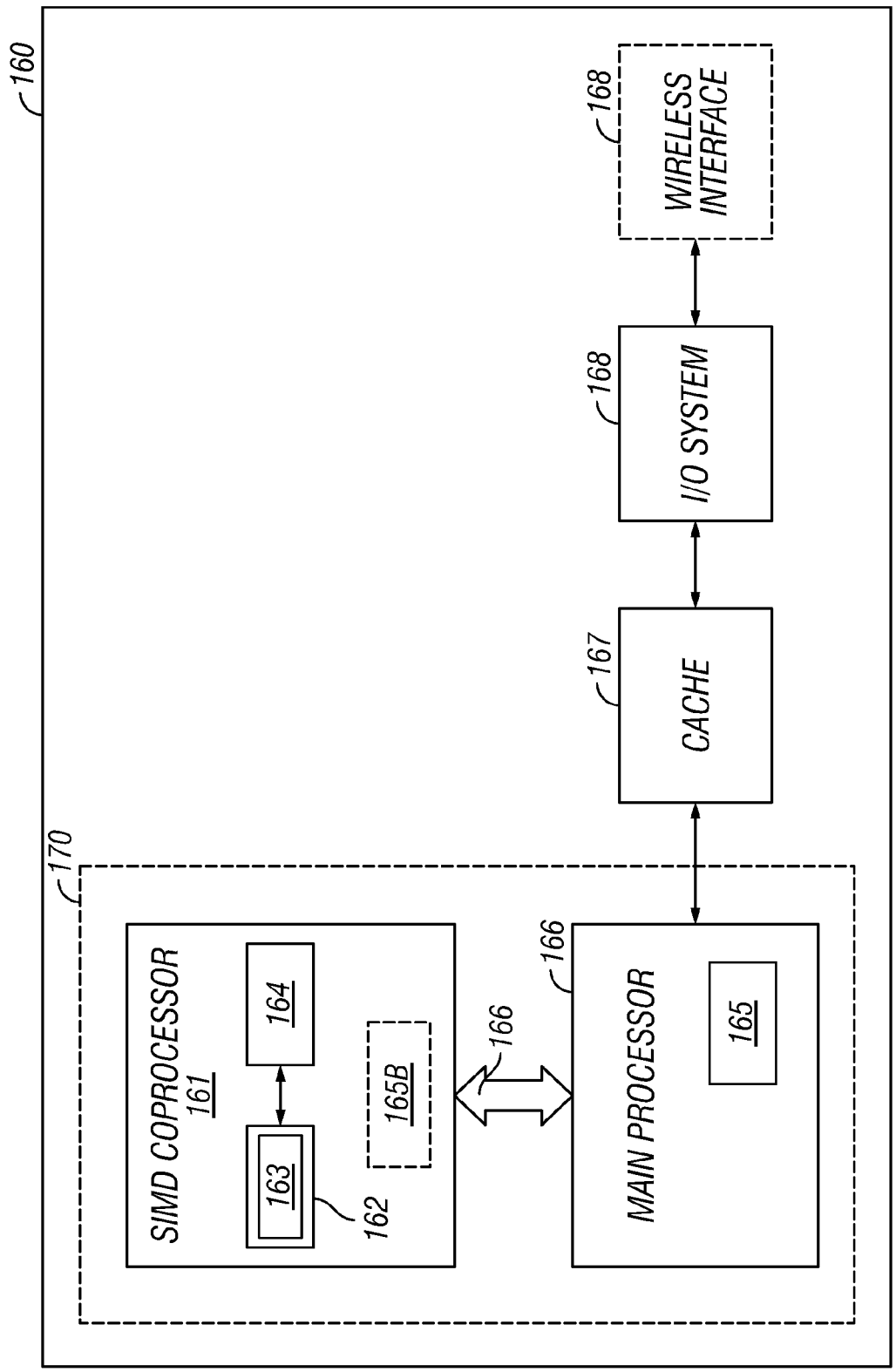
FIG. 1C illustrates other embodiments of a data processing system for performing text string comparison operations.

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 165 comprises a decoder 165 to recognize instructions of instruction set 163 including instructions in accordance with one embodiment for execution by execution unit 162. In other embodiments, SIMD coprocessor 161 also comprises at least part of decoder 165 to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 166. From coprocessor bus 166, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
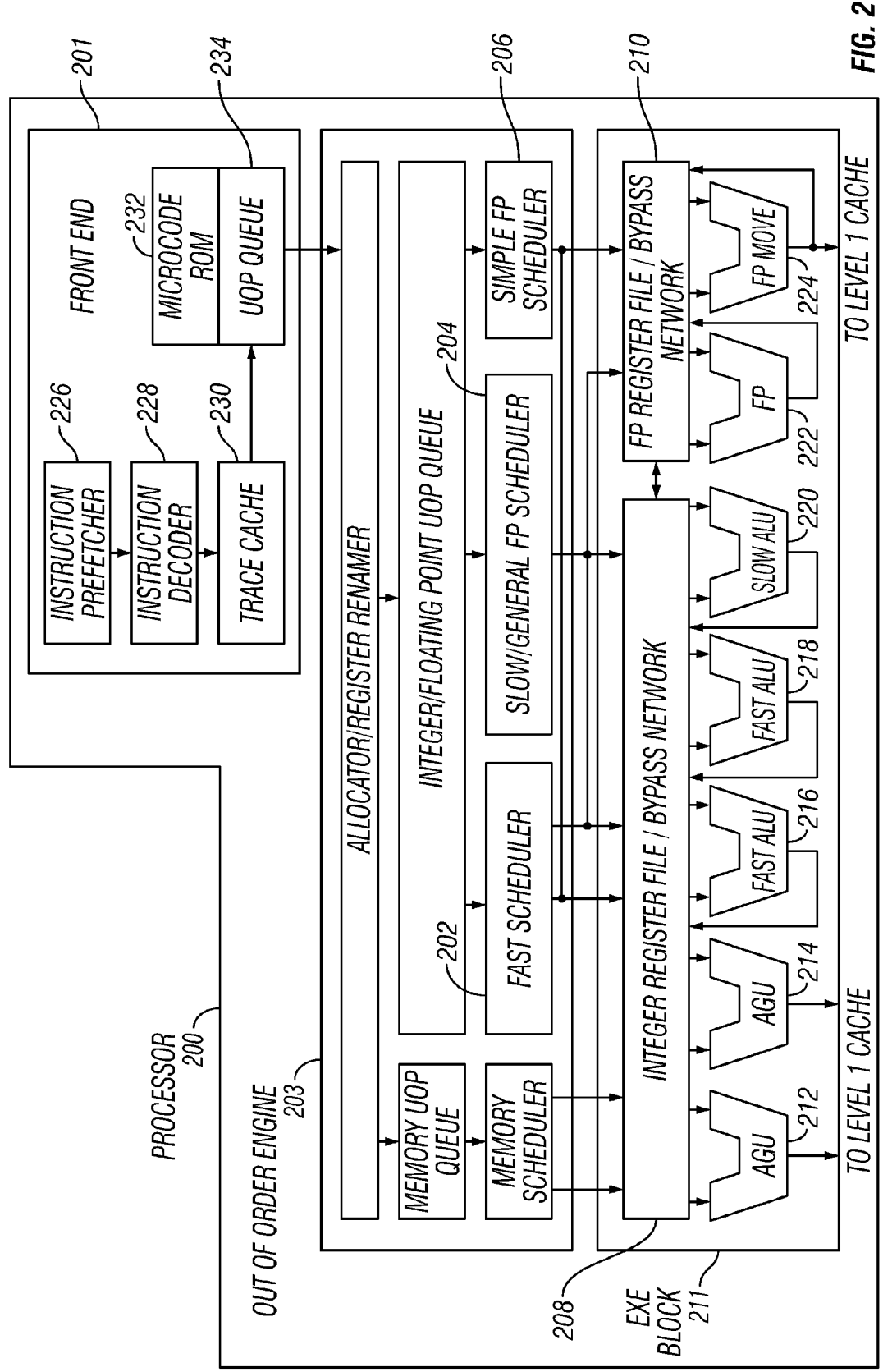
FIG. 2 is a block diagram of the micro-architecture for a processor that may include logic circuits to perform instructions, in accordance with embodiments of the present disclosure.

FIG. 2 is a block diagram of the micro-architecture for a processor 200 that may include logic circuits to perform instructions, in accordance with embodiments of the present disclosure. In some embodiments, an instruction in accordance with one embodiment may be implemented to operate on data elements having sizes of byte, word, doubleword, quadword, etc., as well as datatypes, such as single and double precision integer and floating point datatypes. In one embodiment, in-order front end 201 may implement a part of processor 200 that may fetch instructions to be executed and prepares the instructions to be used later in the processor pipeline. Front end 201 may include several units. In one embodiment, instruction prefetcher 226 fetches instructions from memory and feeds the instructions to an instruction decoder 228 which in turn decodes or interprets the instructions. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that may be used by the micro-architecture to perform operations in accordance with one embodiment. In one embodiment, trace cache 230 may assemble decoded uops into program ordered sequences or traces in uop queue 234 for execution. When trace cache 230 encounters a complex instruction, microcode ROM 232 provides the uops needed to complete the operation.

Some instructions may be converted into a single micro-op, whereas others need several micro-ops to complete the full operation. In one embodiment, if more than four micro-ops are needed to complete an instruction, decoder 228 may access microcode ROM 232 to perform the instruction. In one embodiment, an instruction may be decoded into a small number of micro-ops for processing at instruction decoder 228. In another embodiment, an instruction may be stored within microcode ROM 232 should a number of micro-ops be needed to accomplish the operation. Trace cache 230 refers to an entry point programmable logic array (PLA) to determine a correct micro-instruction pointer for reading the micro-code sequences to complete one or more instructions in accordance with one embodiment from micro-code ROM 232. After microcode ROM 232 finishes sequencing micro-ops for an instruction, front end 201 of the machine may resume fetching micro-ops from trace cache 230.

Out-of-order execution engine 203 may prepare instructions for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. Uop schedulers 202, 204, 206, determine when a uop is ready to execute based on the readiness of their dependent input register operand sources and the availability of the execution resources the uops need to complete their operation. Fast scheduler 202 of one embodiment may schedule on each half of the main clock cycle while the other schedulers may only schedule once per main processor clock cycle. The schedulers arbitrate for the dispatch ports to schedule uops for execution.

Register files 208, 210 may be arranged between schedulers 202, 204, 206, and execution units 212, 214, 216, 218, 220, 222, 224 in execution block 211. Each of register files 208, 210 perform integer and floating point operations, respectively. Each register file 208, 210, may include a bypass network that may bypass or forward just completed results that have not yet been written into the register file to new dependent uops. Integer register file 208 and floating point register file 210 may communicate data with the other. In one embodiment, integer register file 208 may be split into two separate register files, one register file for low-order thirty-two bits of data and a second register file for high order thirty-two bits of data. Floating point register file 210 may include 128-bit wide entries because floating point instructions typically have operands from 64 to 128 bits in width.

Execution block 211 may contain execution units 212, 214, 216, 218, 220, 222, 224. Execution units 212, 214, 216, 218, 220, 222, 224 may execute the instructions. Execution block 211 may include register files 208, 210 that store the integer and floating point data operand values that the micro-instructions need to execute. In one embodiment, processor 200 may comprise a number of execution units: address generation unit (AGU) 212, AGU 214, fast Arithmetic Logic Unit (ALU) 216, fast ALU 218, slow ALU 220, floating point ALU 222, floating point move unit 224. In another embodiment, floating point execution blocks 222, 224, may execute floating point, MMX, SIMD, and SSE, or other operations. In yet another embodiment, floating point ALU 222 may include a 64-bit by 64-bit floating point divider to execute divide, square root, and remainder microops. In various embodiments, instructions involving a floating point value may be handled with the floating point hardware. In one embodiment, ALU operations may be passed to high-speed ALU execution units 216, 218. High-speed ALUs 216, 218 may execute fast operations with an effective latency of half a clock cycle. In one embodiment, most complex integer operations go to slow ALU 220 as slow ALU 220 may include integer execution hardware for long-latency type of operations, such as a multiplier, shifts, flag logic, and branch processing. Memory load/store operations may be executed by AGUs 212, 214. In one embodiment, integer ALUs 216, 218, 220 may perform integer operations on 64-bit data operands. In other embodiments, ALUs 216, 218, 220 may be implemented to support a variety of data bit sizes including sixteen, thirty-two, 128, 256, etc. Similarly, floating point units 222, 224 may be implemented to support a range of operands having bits of various widths. In one embodiment, floating point units 222, 224, may operate on 128-bit wide packed data operands in conjunction with SIMD and multimedia instructions.

In one embodiment, uops schedulers 202, 204, 206, dispatch dependent operations before the parent load has finished executing. As uops may be speculatively scheduled and executed in processor 200, processor 200 may also include logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations might need to be replayed and the independent ones may be allowed to complete. The schedulers and replay mechanism of one embodiment of a processor may also be designed to catch instruction sequences for text string comparison operations.

The term "registers" may refer to the on-board processor storage locations that may be used as part of instructions to identify operands. In other words, registers may be those that may be usable from the outside of the processor (from a programmer's perspective). However, in some embodiments registers might not be limited to a particular type of circuit. Rather, a register may store data, provide data, and perform the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register file of one embodiment also contains eight multimedia SIMD registers for packed data. For the discussions below, the registers may be understood to be data registers designed to hold packed data, such as 64-bit wide MMX™ registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128-bit wide XMM registers relating to SSE2, SSE3, SSE4, or beyond (referred to generically as "SSEx") technology may hold such packed data operands. In one embodiment, in storing packed data and integer data, the registers do not need to differentiate between the two data types. In one embodiment, integer and floating point may be contained in the same register file or different register files. Furthermore, in one embodiment, floating point and integer data may be stored in different registers or the same registers.

Figure 3A:
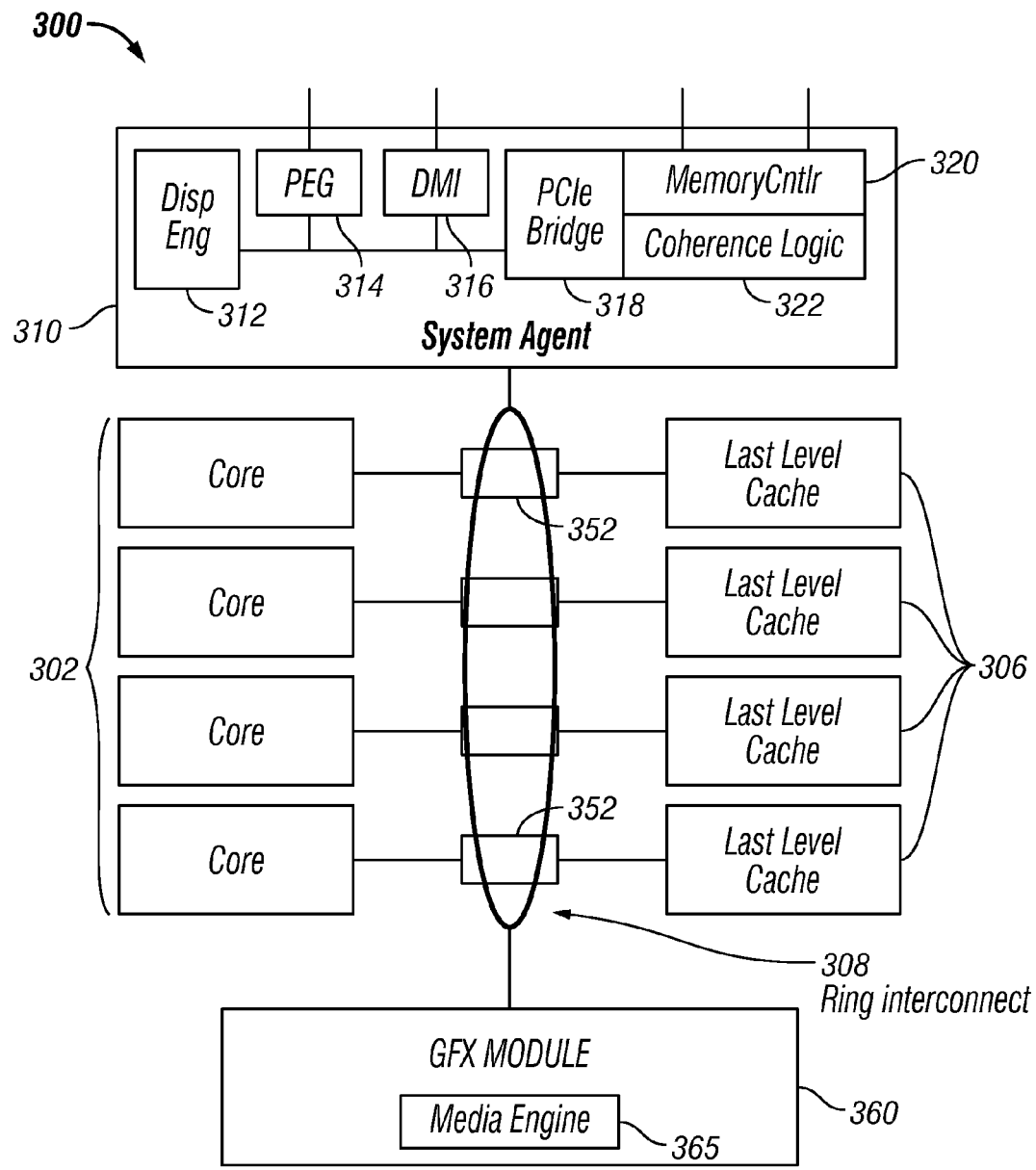
FIG. 3A is a block diagram of a processor, in accordance with embodiments of the present disclosure.
Figure 3B:
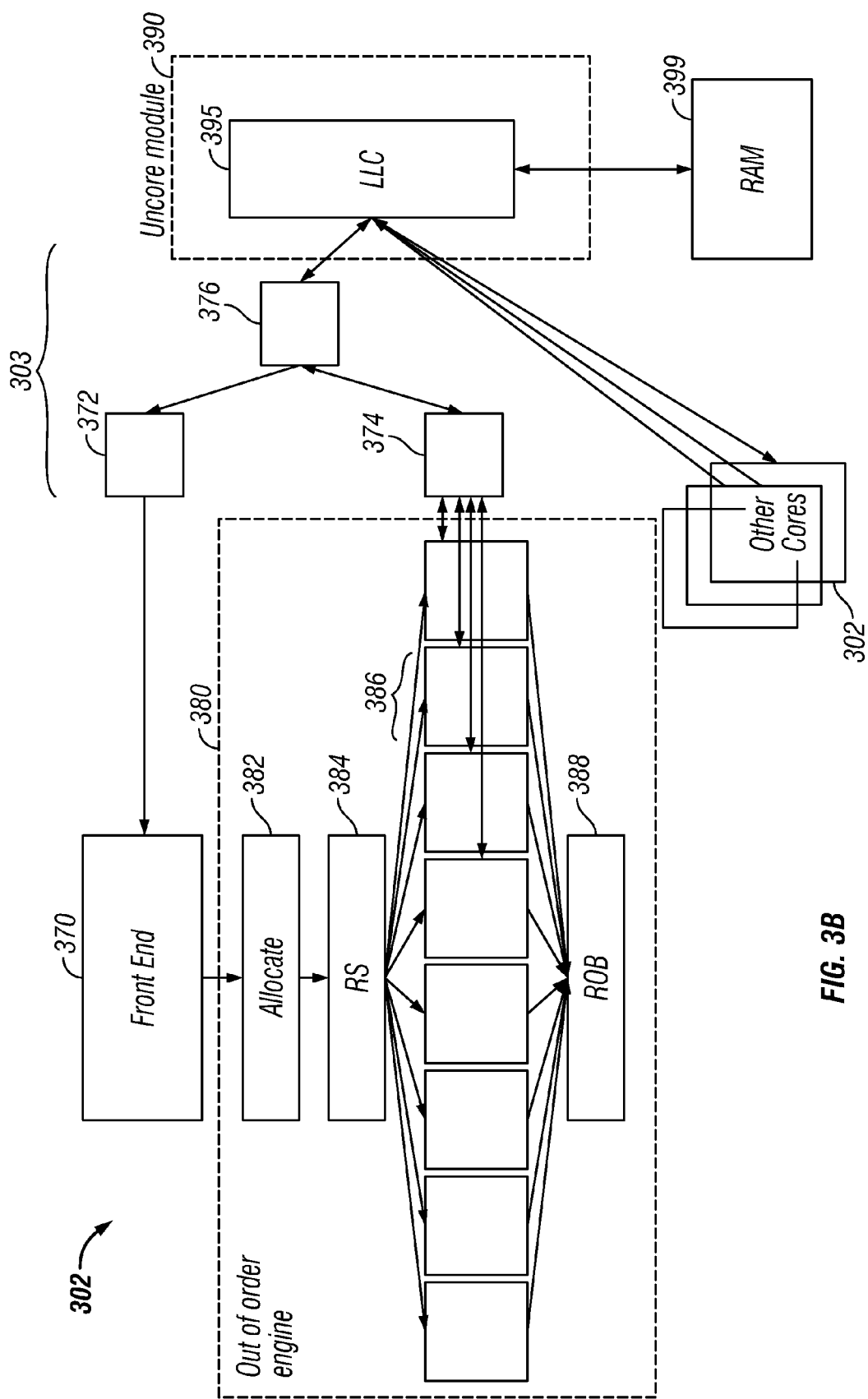
FIG. 3B is a block diagram of an example implementation of a core, in accordance with embodiments of the present disclosure.
Figure 4:
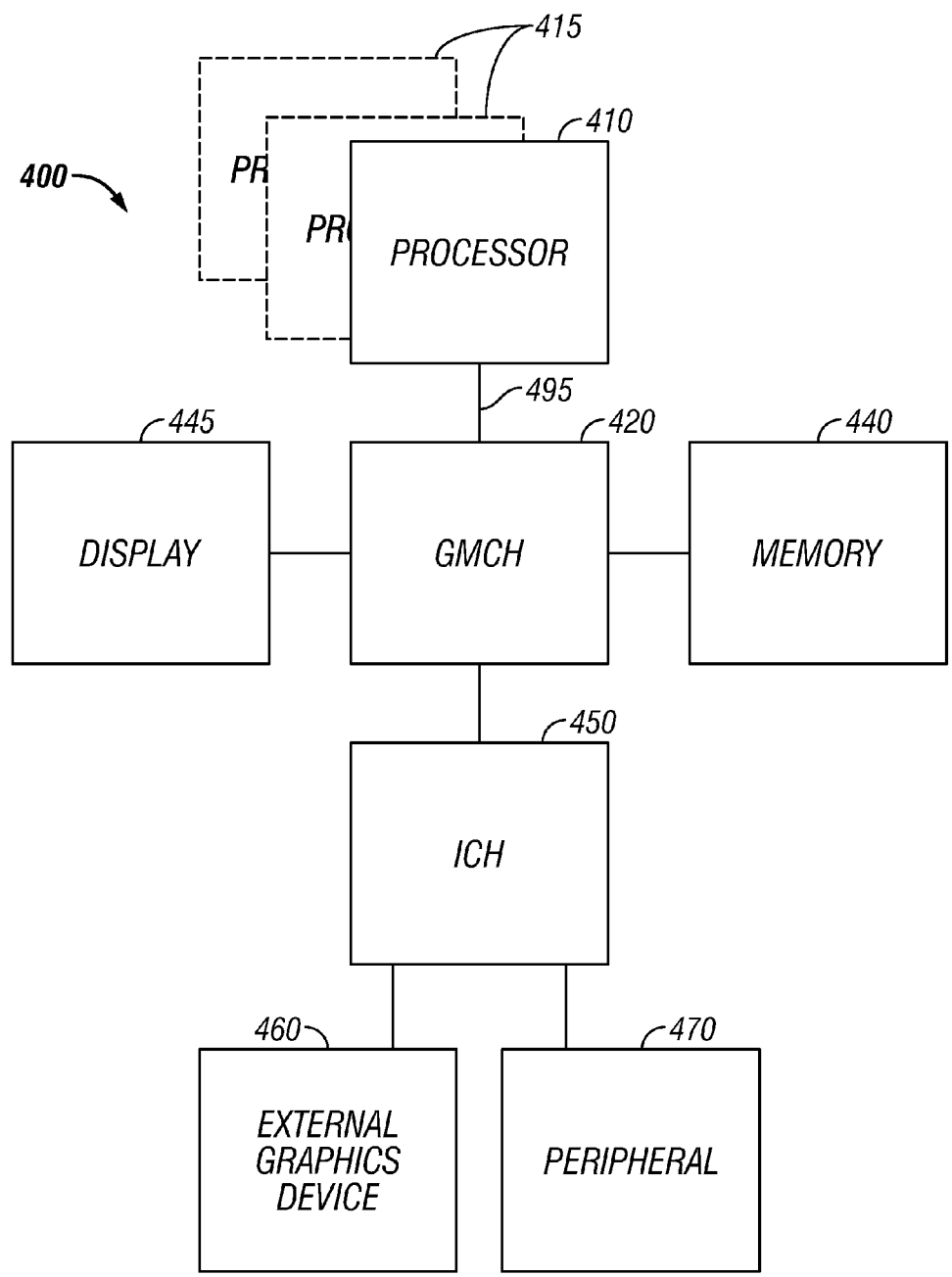
FIG. 4 is a block diagram of a system, in accordance with embodiments of the present disclosure.
Figure 5:
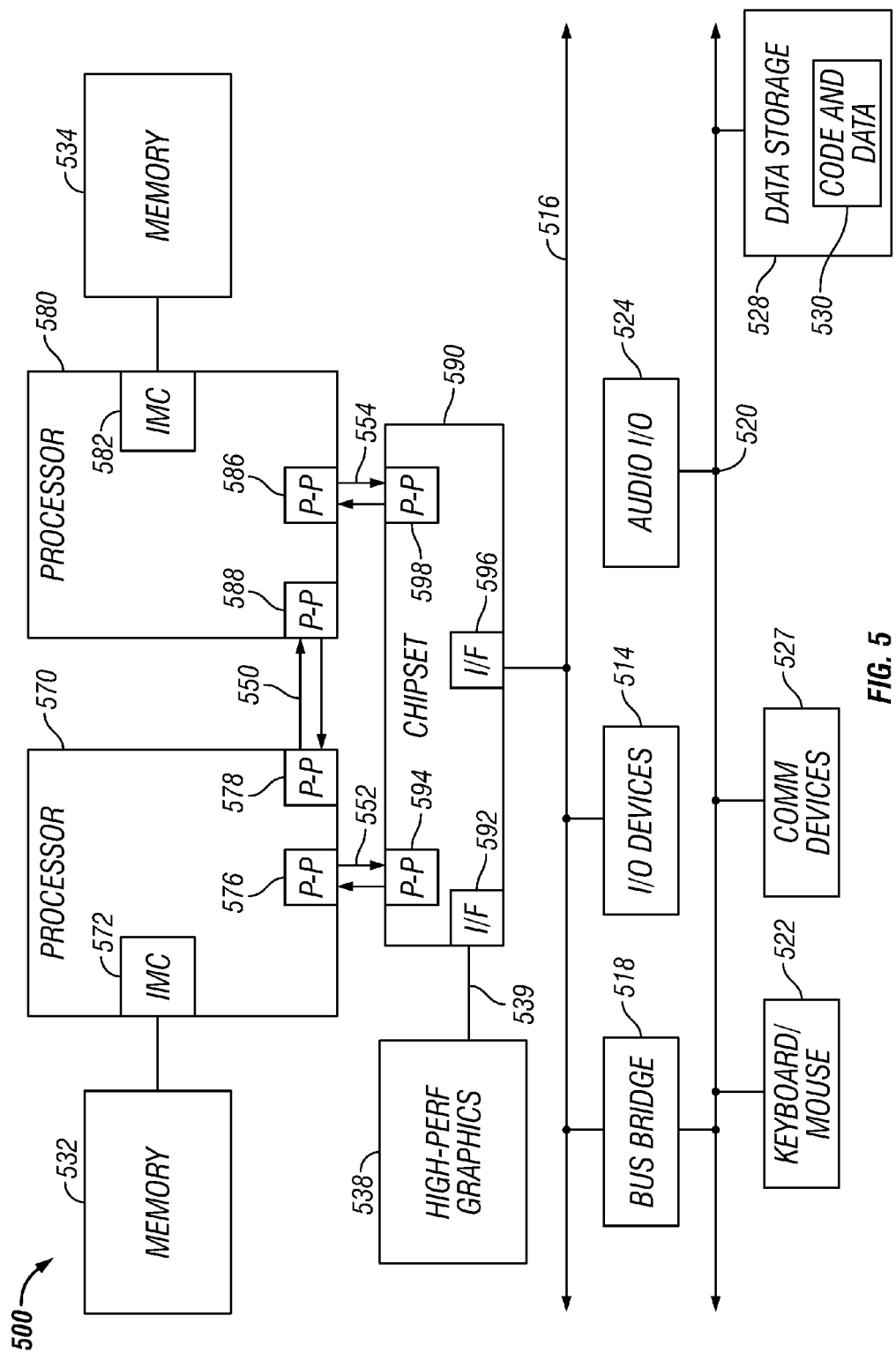
FIG. 5 is a block diagram of a second system, in accordance with embodiments of the present disclosure.

FIGS. 3-5 may illustrate exemplary systems suitable for including processor 300, while FIG. 4 may illustrate an exemplary System on a Chip (SoC) that may include one or more of cores 302. Other system designs and implementations known in the arts for laptops, desktops, handheld PCs, personal digital assistants, engineering workstations, servers, network devices, network hubs, switches, embedded processors, DSPs, graphics devices, video game devices, set-top boxes, micro controllers, cell phones, portable media players, hand held devices, and various other electronic devices, may also be suitable. In general, a huge variety of systems or electronic devices that incorporate a processor and/or other execution logic as disclosed herein may be generally suitable.

FIG. 4 illustrates a block diagram of a system 400, in accordance with embodiments of the present disclosure. System 400 may include one or more processors 410, 415, which may be coupled to Graphics Memory Controller Hub (GMCH) 420. The optional nature of additional processors 415 is denoted in FIG. 4 with broken lines.

Each processor 410, 415 may be some version of processor 300. However, it should be noted that integrated graphics logic and integrated memory control units might not exist in processors 410, 415. FIG. 4 illustrates that GMCH 420 may be coupled to a memory 440 that may be, for example, a dynamic random access memory (DRAM). The DRAM may, for at least one embodiment, be associated with a non-volatile cache.

GMCH 420 may be a chipset, or a portion of a chipset. GMCH 420 may communicate with processors 410, 415 and control interaction between processors 410, 415 and memory 440. GMCH 420 may also act as an accelerated bus interface between the processors 410, 415 and other elements of system 400. In one embodiment, GMCH 420 communicates with processors 410, 415 via a multi-drop bus, such as a frontside bus (FSB) 495.

Furthermore, GMCH 420 may be coupled to a display 445 (such as a flat panel display). In one embodiment, GMCH 420 may include an integrated graphics accelerator. GMCH 420 may be further coupled to an input/output (I/O) controller hub (ICH) 450, which may be used to couple various peripheral devices to system 400. External graphics device 460 may include be a discrete graphics device coupled to ICH 450 along with another peripheral device 470.

In other embodiments, additional or different processors may also be present in system 400. For example, additional processors 410, 415 may include additional processors that may be the same as processor 410, additional processors that may be heterogeneous or asymmetric to processor 410, accelerators (such as, e.g., graphics accelerators or digital signal processing (DSP) units), field programmable gate arrays, or any other processor. There may be a variety of differences between the physical resources 410, 415 in terms of a spectrum of metrics of merit including architectural, micro-architectural, thermal, power consumption characteristics, and the like. These differences may effectively manifest themselves as asymmetry and heterogeneity amongst processors 410, 415. For at least one embodiment, various processors 410, 415 may reside in the same die package.

FIG. 5 illustrates a block diagram of a second system 500, in accordance with embodiments of the present disclosure. As shown in FIG. 5, multiprocessor system 500 may include a point-to-point interconnect system, and may include a first processor 570 and a second processor 580 coupled via a point-to-point interconnect 550. Each of processors 570 and 580 may be some version of processor 300 as one or more of processors 410,615.

While FIG. 5 may illustrate two processors 570, 580, it is to be understood that the scope of the present disclosure is not so limited. In other embodiments, one or more additional processors may be present in a given processor.

Processors 570 and 580 are shown including integrated memory controller units 572 and 582, respectively. Processor 570 may also include as part of its bus controller units point-to-point (P-P) interfaces 576 and 578; similarly, second processor 580 may include P-P interfaces 586 and 588. Processors 570, 580 may exchange information via a point-to-point (P-P) interface 550 using P-P interface circuits 578, 588. As shown in FIG. 5, IMCs 572 and 582 may couple the processors to respective memories, namely a memory 532 and a memory 534, which in one embodiment may be portions of main memory locally attached to the respective processors.

Processors 570, 580 may each exchange information with a chipset 590 via individual P-P interfaces 552, 554 using point to point interface circuits 576, 594, 586, 598. In one embodiment, chipset 590 may also exchange information with a high-performance graphics circuit 538 via a high-performance graphics interface 539.

A shared cache (not shown) may be included in either processor or outside of both processors, yet connected with the processors via P-P interconnect, such that either or both processors' local cache information may be stored in the shared cache if a processor is placed into a low power mode.

Chipset 590 may be coupled to a first bus 516 via an interface 596. In one embodiment, first bus 516 may be a Peripheral Component Interconnect (PCI) bus, or a bus such as a PCI Express bus or another third generation I/O interconnect bus, although the scope of the present disclosure is not so limited.

As shown in FIG. 5, various I/O devices 514 may be coupled to first bus 516, along with a bus bridge 518 which couples first bus 516 to a second bus 520. In one embodiment, second bus 520 may be a Low Pin Count (LPC) bus. Various devices may be coupled to second bus 520 including, for example, a keyboard and/or mouse 522, communication devices 527 and a storage unit 528 such as a disk drive or other mass storage device which may include instructions/code and data 530, in one embodiment. Further, an audio I/O 524 may be coupled to second bus 520. Note that other architectures may be possible. For example, instead of the point-to-point architecture of FIG. 5, a system may implement a multi-drop bus or other such architecture.

Figure 6:
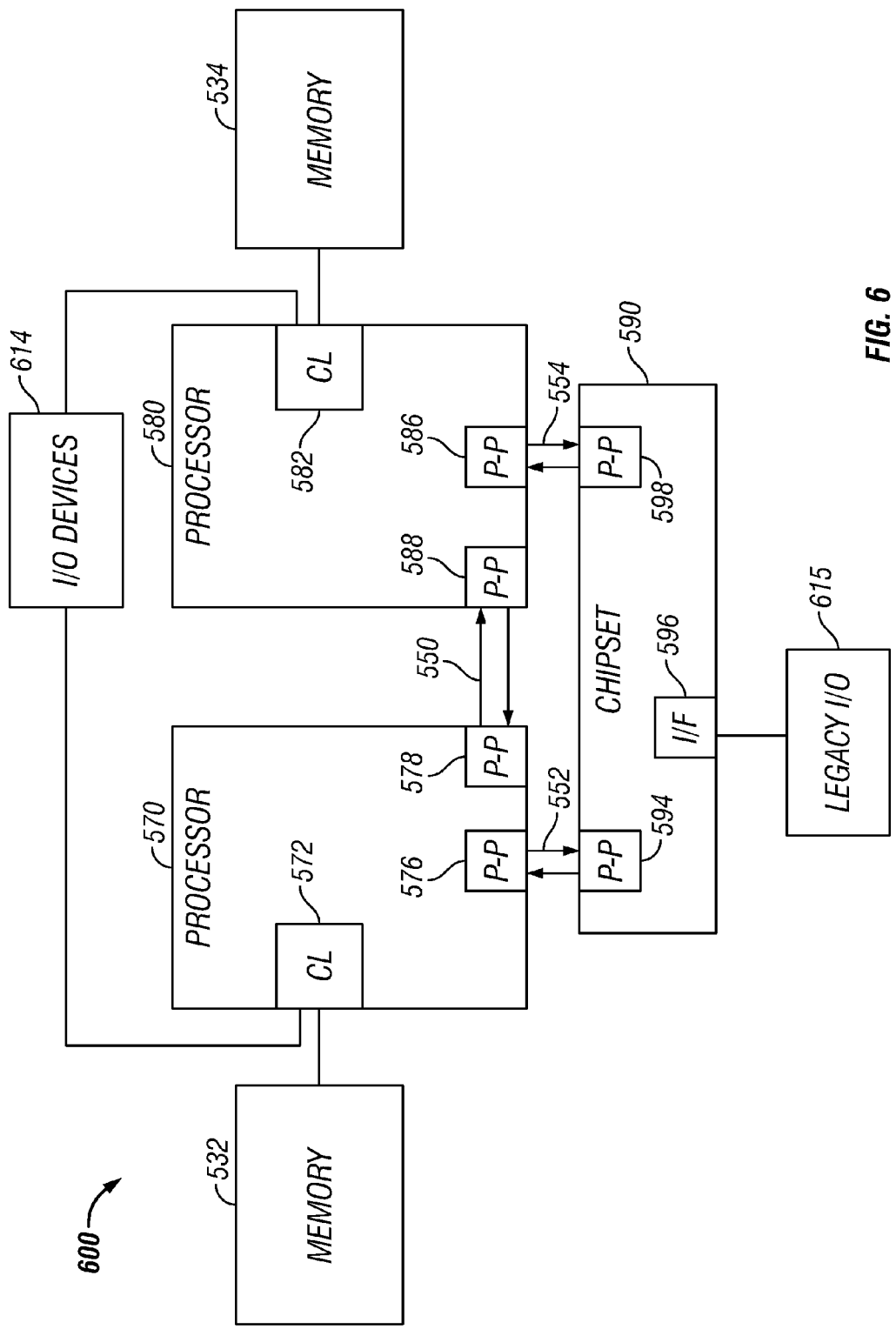
FIG. 6 is a block diagram of a third system in accordance with embodiments of the present disclosure.

FIG. 6 illustrates a block diagram of a third system 600 in accordance with embodiments of the present disclosure. Like elements in FIGS. 5 and 6 bear like reference numerals, and certain aspects of FIG. 5 have been omitted from FIG. 6 in order to avoid obscuring other aspects of FIG. 6.

FIG. 6 illustrates that processors 670, 680 may include integrated memory and I/O Control Logic ("CL") 672 and 682, respectively. For at least one embodiment, CL 672, 682 may include integrated memory controller units such as that described above in connection with FIGS. 3-5. In addition, CL 672, 682 may also include I/O control logic. FIG. 6 illustrates that not only memories 632, 634 may be coupled to CL 672, 682, but also that I/O devices 614 may also be coupled to control logic 672, 682. Legacy I/O devices 615 may be coupled to chipset 690.

Figure 7:
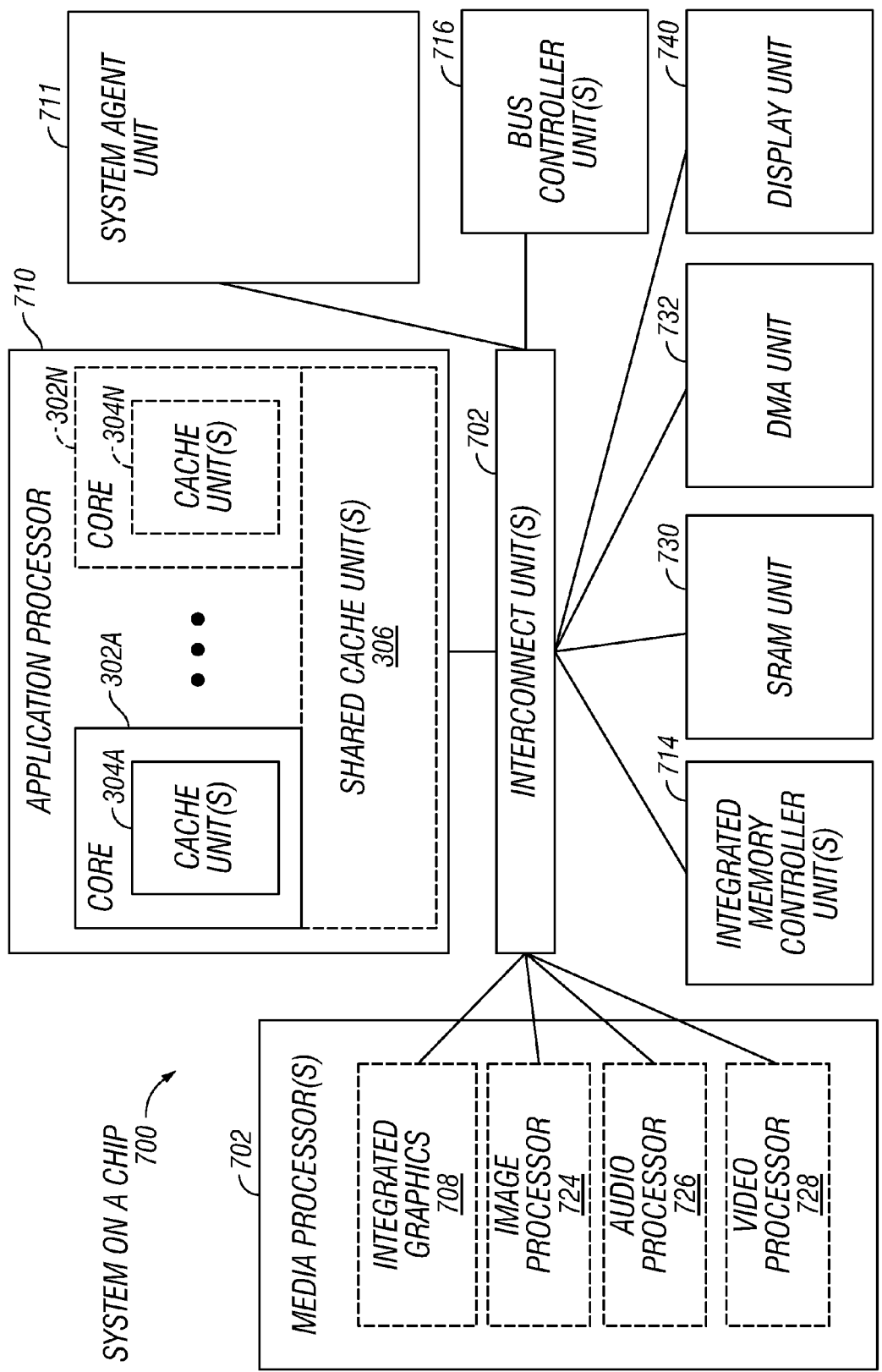
FIG. 7 is a block diagram of a system-on-a-chip, in accordance with embodiments of the present disclosure.

FIG. 7 illustrates a block diagram of a SoC 700, in accordance with embodiments of the present disclosure. Similar elements in FIG. 3 bear like reference numerals. Also, dashed lined boxes may represent optional features on more advanced SoCs. An interconnect units 702 may be coupled to: an application processor 710 which may include a set of one or more cores 702A-N and shared cache units 706; a system agent unit 711; a bus controller units 716; an integrated memory controller units 714; a set or one or more media processors 720 which may include integrated graphics logic 708, an image processor 724 for providing still and/or video camera functionality, an audio processor 726 for providing hardware audio acceleration, and a video processor 728 for providing video encode/decode acceleration; an SRAM unit 730; a DMA unit 732; and a display unit 740 for coupling to one or more external displays.

Figure 8:
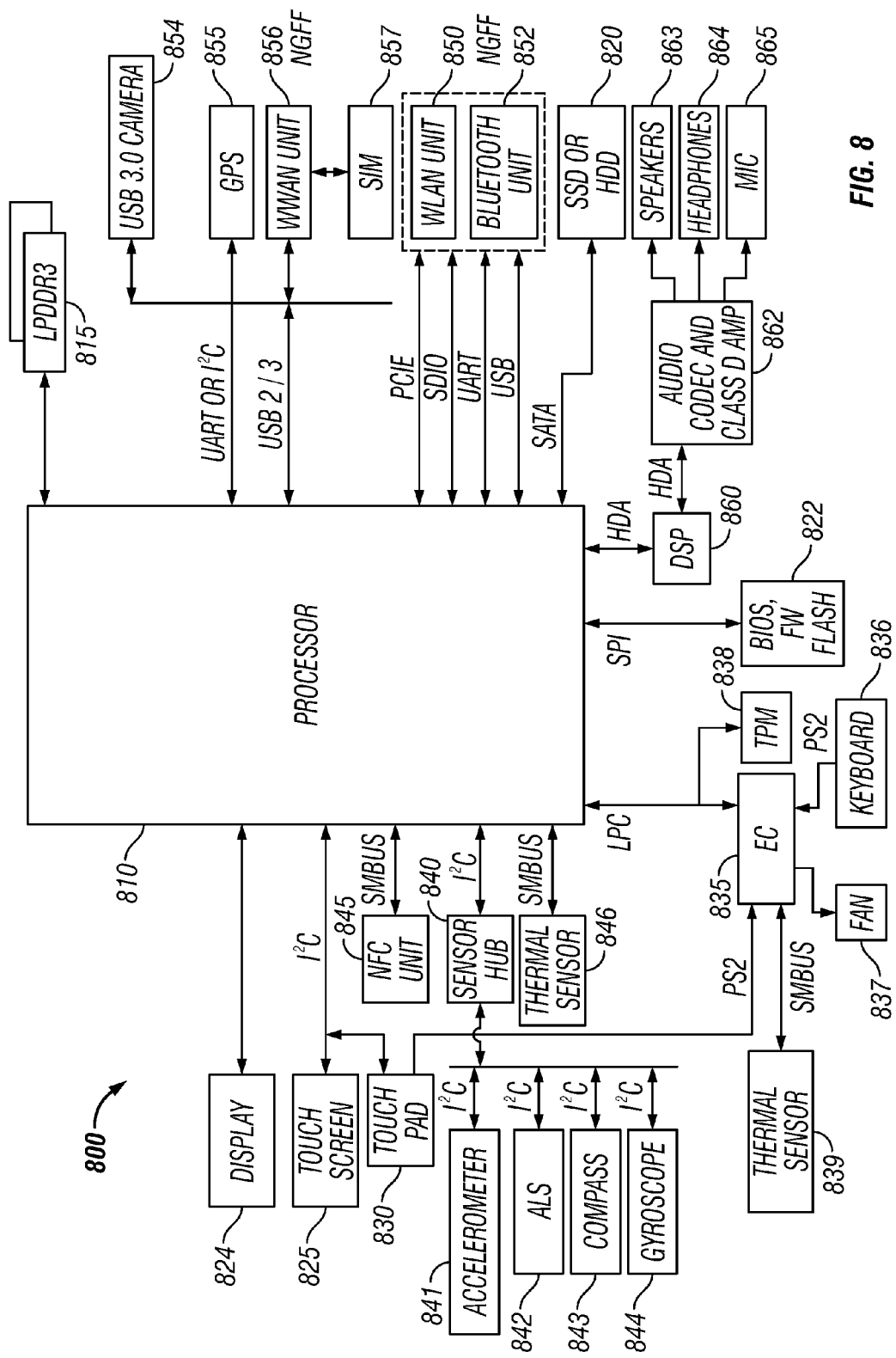
FIG. 8 is a block diagram of an electronic device for utilizing a processor, in accordance with embodiments of the present disclosure.

FIG. 8 is a block diagram of an electronic device 800 for utilizing a processor 810, in accordance with embodiments of the present disclosure. Electronic device 800 may include, for example, a notebook, an ultrabook, a computer, a tower server, a rack server, a blade server, a laptop, a desktop, a tablet, a mobile device, a phone, an embedded computer, or any other suitable electronic device.

Electronic device 800 may include processor 810 communicatively coupled to any suitable number or kind of components, peripherals, modules, or devices. Such coupling may be accomplished by any suitable kind of bus or interface, such as I$^2$C bus, System Management Bus (SMBus), Low Pin Count (LPC) bus, SPI, High Definition Audio (HDA) bus, Serial Advance Technology Attachment (SATA) bus, USB bus (versions 1, 2, 3), or Universal Asynchronous Receiver/Transmitter (UART) bus.

Such components may include, for example, a display 824, a touch screen 825, a touch pad 830, a Near Field Communications (NFC) unit 845, a sensor hub 840, a thermal sensor 846, an Express Chipset (EC) 835, a Trusted Platform Module (TPM) 838, BIOS/firmware/flash memory 822, a DSP 860, a drive 820 such as a Solid State Disk (SSD) or a Hard Disk Drive (HDD), a wireless local area network (WLAN) unit 850, a Bluetooth unit 852, a Wireless Wide Area Network (WWAN) unit 856, a Global Positioning System (GPS), a camera 854 such as a USB 3.0 camera, or a Low Power Double Data Rate (LPDDR) memory unit 815 implemented in, for example, the LPDDR3 standard. These components may each be implemented in any suitable manner.

Furthermore, in various embodiments other components may be communicatively coupled to processor 810 through the components discussed above. For example, an accelerometer 841, Ambient Light Sensor (ALS) 842, compass 843, and gyroscope 844 may be communicatively coupled to sensor hub 840. A thermal sensor 839, fan 837, keyboard 846, and touch pad 830 may be communicatively coupled to EC 835. Speaker 863, headphones 864, and a microphone 865 may be communicatively coupled to an audio unit 864, which may in turn be communicatively coupled to DSP 860. Audio unit 864 may include, for example, an audio codec and a class D amplifier. A SIM card 857 may be communicatively coupled to WWAN unit 856. Components such as WLAN unit 850 and Bluetooth unit 852, as well as WWAN unit 856 may be implemented in a Next Generation Form Factor (NGFF).

Figure 9:
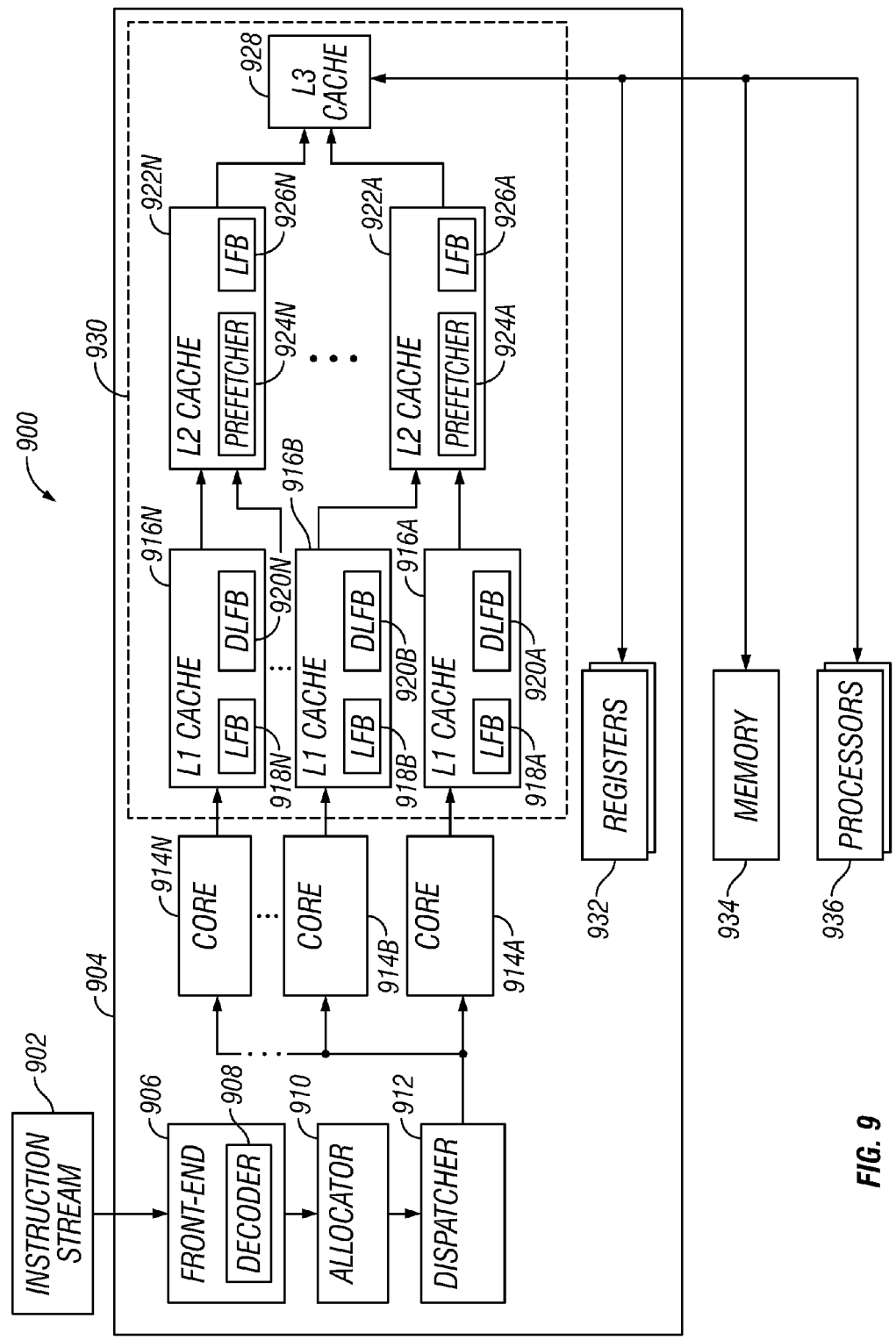
FIG. 9 illustrates an example system for implementing a cache prefetcher, in accordance with embodiments of the present disclosure.

Embodiments of the present disclosure involve an instruction and logic for a cache prefetcher. Furthermore, embodiments of the present disclosure involve an instruction and logic for a dataless fill buffer for use in conjunction with the cache prefetcher. FIG. 9 illustrates an example system 900 for implementing a cache prefetcher, in accordance with embodiments of the present disclosure. Although various elements of system 900 are described herein as example embodiments, any suitable portion of system 900 may perform the functionality described herein. System 900 may further implement a dataless fill buffer. System 900 may implement a cache prefetcher and dataless fill buffer upon any suitable cache in a processor, such as processor 904. Processor 904 may include a cache hierarchy 930 which may be accessed by various execution units of processor 904. The access may be made by memory operations directed to register or memory values. In one embodiment, system 900 may include one or more cache prefetchers 924. In another embodiment, system 900 may include one or more dataless fill buffers (DLFB) 920. Cache prefetchers and DLFBs 920 may be implemented in any suitable portion of processor 904. In one embodiment, cache prefetchers and DLFBs 920 may be implemented within various levels of cache hierarchy 930.

Cache hierarchy 930 may be implemented as part of a memory execution unit within processor 904 to serve one or more execution units, cores, or other processing entities. Cache hierarchy may provide data to such execution units during the execution of instructions, such as instruction stream 902. The execution of instruction stream 902 may be performed by any suitable number and kind of elements within processor 904. For example, processor 904 may include a front-end 906 including a decoder 908, an allocator 910, a dispatcher 912, and one or more cores 914. Processor 904 may be implemented with any suitable combination of elements such as those illustrated in FIGS. 1-8. Front-end 906 may parse instruction stream 902 for instructions, which may be decoded by decoder 908. Decoder 908 may send the decoded instructions to allocator 910, which may rename registers, allocate resources, or perform other execution management tasks. Allocator 910 may send the instructions to dispatcher 912, which may determine which of cores 914 are to execute a given instruction. After the instruction is executed, the instruction may be retired by a retirement unit (not shown). Retirement of the instruction may include reading or writing resultant data to registers or to memory.

Execution of elements of instruction stream 902 may include execution of memory operations or instructions. Such memory operations or instructions may include read or write operations to registers 932 or memory 934, which may be implemented within or outside of processor 904. Furthermore, read or write operations may be made to other portions of system 900, such as parts of other processors 936. In order to speed execution, cache hierarchy 930 may provide access to local cached copies of memory or register locations to cores 914. If an attempted memory operation on a given level of cache hierarchy is for an address or element not present with the level of cache hierarchy 930, the attempted memory operation may be described as a miss. A miss may include a request for information that is unavailable, or a request to write information to a location that is unavailable. The given level of cache hierarchy 930 may attempt to request the address or element from a higher level of cache hierarchy 930. If the element is available at such a higher level of cache hierarchy 930, the element may be returned to the given level of cache hierarchy 930 and the value stored therein. Moreover, the element or value thereof may be returned to, for example, the core 914 making the request or to a level of cache hierarchy 930 lower than the given level, as appropriate. If the element is not available at such a higher level of cache hierarchy 930, a miss at the higher level of cache hierarchy 930 may be generated and the element requested from a still-higher level of cache hierarchy 930. Cache hierarchy 930 may perform such serving of misses at any level of cache hierarchy 930. Moreover, if the element is not found within cache hierarchy 930, the element may be accessed from the actual location in, for example, registers 932, memory 934, or processors 936. In one embodiment, the operation of a given level of cache hierarchy 930 may be performed again at a higher level of cache hierarch 930.

Cache hierarchy 930 may be implemented in any suitable manner. In the example of FIG. 9, cache hierarchy 930 may include three levels, though more or less levels may be used. For example, cache hierarchy may include one or more L1 caches 916 at a lowest level of cache hierarchy 930, one or more L2 caches 922 at a middle level of cache hierarchy 930, and an L3 cache 928 at a highest level of cache hierarchy 928. A single instance of L3 cache 928 may serve two or more L2 caches 922. A single instance of L2 cache 922 may serve two or more L1 caches 916. In one embodiment, an L1 cache 916 may serve an individual core 914. In another embodiment, an L1 cache 916 may serve two or more cores 914. L1 caches 916 may be more numerous than L2 caches 922 or L3 cache 928 and may be located physically closer to cores 914 than other portions of cache hierarchy 930. Such short distances may provide faster access for cores 914 to memory values when compared to the actual location of such memory values in, for example, registers 932, memory 934, or other processors 936. In some embodiments, L1 caches 916 may be smaller than L2 caches 922, which may be smaller than L3 cache 928. In turn, L3 cache 928 may be smaller than the full set of memory locations that might be addressable in registers 932, memory 934, or through processors 936. The size of a given cache element may include the number of data elements stored therein for provision to cores 914 or to lower levels of cache hierarch 930. The data elements may be referred to as cache lines.

Trade-offs may be made between the size of cache elements within cache hierarchy 930 and the speed by which cores 914 may access the values ultimately resident within registers 932, memory 934, or through processors 936, as well as the processing required to coordinate and manage the operation of such cache elements. For example, larger cache elements may provide faster access for cores 914, as a given cache element is more likely to include a value requested by cores 914. However, space in such cache elements may be very expensive. Moreover, in some cases all instances of a given level of cache hierarchy 930 may include the same values. Thus, changes to one cache element of a given level of cache hierarchy 930 may require significant coordination with the other cache elements at the same level. Moreover, cache hierarchy 930 may include management of speculative reads, speculative writes, and other mechanisms to ensure data consistency and data usage consistency as the same data may be both read and written by different cores 914.

An instance of a given level of cache hierarchy 930 may include any suitable information, data, or other elements. In one embodiment, each instance of the levels of cache hierarchy 930 may include data cache lines containing information for provision to lower levels of cache hierarchy 930 and to cores 914. The size of each such instance may vary according to the level of cache hierarchy 930. In another embodiment, each instance of the levels of cache hierarchy may include a line fill buffer (LFB). For example, each L1 cache 916 may include an instance of LFB 918, and each L2 cache 922 may include an instance of LFB 926. Each LFB may track outgoing and incoming cache miss transactions. The cache miss transactions may include, for example, global observation of misses, completion notifications, and data chunks arriving from higher levels of cache hierarch 930. Each LFB 918, LFB 926 may include a plurality of entries. In one embodiment, the number of entries in a given LFB may be significantly less than the number of data cache entries within the cache element. For example, LFB 918 may have fewer entries than the number of data cache lines in L1 cache 916, and LFB 926 may have fewer entries than the number of data cache lines in L2 cache 922. A single entry in LFB 918 or LFB 926 may track a single cache line address missed in the respective cache. However, LFB 918 and LFB 926 might not be scalable and may be complicated. Increasing the size of LFB 918 and LFB 926 may be very expensive in terms of resources and space that might come at the expense of, for example, the number of cache lines in the cache. For example, in addition to storing the data from the associated data cache line, LFB 918 and LFB 926 might also store the address of the data, status information, and various other cache management information. Placing a miss entry in LFB 918, LFB 926 may reserve a space in the cache element for receiving values from a higher level of cache hierarchy 930. However, given the constraints on LFB 918, LFB 926, in some situations there may be more cache misses, observation messages, completion messages, or other cache communication than available entries in LFB 918 or LFB 926.

When the respective LFB is full, a cache miss may have to wait until an entry is freed in the LFB before the cache miss can be entered into the LFB and then serviced. Furthermore, any steps that might need to be taken subsequent to the cache miss being placed in the LFB, such as retrieval of data from one or more higher levels of cache hierarchy 930, may be delayed from initiating. The cache miss may be blocked until an entry in the LFB is freed. The number of in-flight misses that may be serviced in parallel may thus, without the implementation of system 900 described herein, otherwise be limited to the size of the LFB. The longest part of servicing a cache miss may be retrieving the needed information from higher levels of cache hierarchy 930, registers 932, memory 934, or other processors 936. Such latency is compounded by the delay in initiating the retrieval because of a lack of sufficient room in the LFB. As described above, increasing the size of the LFB might not be practical or possible. In one embodiment, system 900 may employ cache prefetchers, such as cache prefetcher 924, to overcome scalability issues associated with LFBs and support more in-flight cache misses without increasing the size of the LFBs. Cache prefetcher 924 may initiate retrieval of information from higher levels of cache hierarchy 930 or registers 932, memory 934, or other processors 936 while a lower level of cache hierarchy 930 is waiting to add the miss to an LFB. In another embodiment, system 900 may employ DLFBs 920 to overcome scalability issues associated with LFBs and support more in-flight cache misses without increasing the size of the LFBs.

Although cache prefetcher 924 is illustrated within L2 cache 922, cache prefetcher 924 may be implemented in any suitable portion of processor 904. Furthermore, although DLFB 920 is illustrated within L1 cache 918, DLFB 924 may be implemented in any suitable portion of processor 904. In addition, cache prefetcher 924 and DLFB 920 illustrate implementation and operation of system 900 with respect to example cache levels such as between L1 cache 916 and L2 cache 922. Additional implementations of these may be made in other cache levels to replicate the functionality described herein for such cache levels.

In one embodiment, given a miss in a given level of cache hierarchy 930, such as in L1 cache 916, cache prefetcher 924 may initiate fetching of the needed data from higher levels of cache hierarchy while the miss is blocked from being added to LFB 918. The miss request may be passed up to, for example, L2 cache 922, L3 cache 928, or any other suitable portion of cache hierarchy 930. The request may cause retrieval from registers 932, memory 934, or other processors 936. In another embodiment, cache prefetcher 924 may be implemented by hardware logic in levels of cache hierarchy 930 higher than the level which generated the miss. In yet another embodiment, the original miss request generated in the lower level of cache hierarchy 930 may remain blocked until a free entry in the respective LFB is made available. For example, while cache prefetcher 924 begins retrieval of necessary data, the miss request may remain blocked from being added to LFB 918 until an entry is freed in LFB 918. As retrieval at such higher levels of cache hierarchy 930 may cause substantial latency, by initiating such retrieval at an earlier time by cache prefetcher 924, the overall latency of miss handling may be reduced. In still yet another embodiment, when an entry in LFB 918 is freed, the miss request may be allocated in LFB 918. L1 cache 916 may process the adding of such an entry as normal, wherein the miss request is propagated to the LFB 926 of L2 cache 922. When the retrieval of data initiated by cache prefetcher 924 is complete, the results may be populated within the data cache lines of L2 cache 922 and notification placed within LFB 926. From there, the notification may be passed back to LFB 918. The results may be populated within the data cache lines of L1 cache 916 and the result may be sent to the lower level of cache or requesting core 914.

In another embodiment, the retrieval process implemented by L2 cache 922 may be made in a similar way. A miss request from L1 cache 916 to L2 cache 922 may be blocked if no entries are available in LFB 926. L2 cache 922 may initiate a request to a cache prefetcher (not shown) of L3 cache 928, which may begin initiation of retrieval while the miss request waits to be added to LFB 926. Thus, in various embodiments, cache prefetcher 924 may be implemented at any cache level of cache hierarchy 930. In yet another embodiment, fill buffer entries in L2 cache 922 may include elements known as super queue (SQ) entries with equivalent functionality to an LFB.

In one embodiment, processor 904 may be able to replace values the data cache lines of L1 cache 916 directly from L2 cache 922. The direct replacement may avoid the step of writing values back to LFB 918 before replacing values in the data cache lines of L1 cache 916. In such an embodiment, cache prefetcher 924 might provide less latency reduction if a memory request missed in L1 cache 916 but was found in L2 cache 922. In a further embodiment, processor 904 may include dataless fill buffer (DLFB) 920 to efficiently facilitate service of misses wherein higher levels of cache may directly replace values in data cache lines of lower levels of cache.

In another embodiment, the lowest level of cache hierarchy 930 may implement DLFB 920. In yet another embodiment, DLFB 920 may be considered "dataless" by its implementation as a filter or other structure that stores the address or identifier of the memory location to be retrieved but not the actual data for the memory location to be retrieved. This may contrast, for example, entries in LFB 918 which contain space to store the data as it is returned from higher levels of cache hierarchy 930. DLFB 920 may be dynamically allocated and revoked as necessary. In various embodiments, DLFB 920 may store portions of a miss request that would otherwise be sent to LFB 918 when LFB 918 has insufficient space. Furthermore, DLFB 920 may store portions of such a miss request while a prefetch request is made of cache prefetcher 924.

In one embodiment, if a prefetch request successfully hits a value stored in L2 cache 922, the data may be read and placed directly in the data cache lines of L1 cache 916. In another embodiment, such replacement may be made without the miss request being entered into LFB 918. The miss request might have been stored within DLFB 920. In yet another embodiment, if the prefetch request misses in L2 cache 922, L2 cache 922 may request the data from L3 cache 928 or other higher levels of cache hierarchy 930. In such an embodiment, DLFB 920 may be deallocated and the miss may be placed within LFB 918 when an entry is freed. Accordingly, DLFB 920 may prevent wasted actions wherein miss requests would be unnecessarily placed in LFB 918.

In some situations, a cache miss may otherwise issue multiple prefetch requests of the same data while LFB 918 has no free entries. In one embodiment, processor 902 may include any suitable number and kind of queues, filters, masks, or other data structures to identify prefetch requests as they are made. Moreover, fulfilled requests may also be recorded. In another embodiment, processor 902 may compare a prefetch request against pending prefetch requests and, if an existing prefetch request is being performed for the same information, the new prefetch request may be suppressed or blocked.

Figure 10:
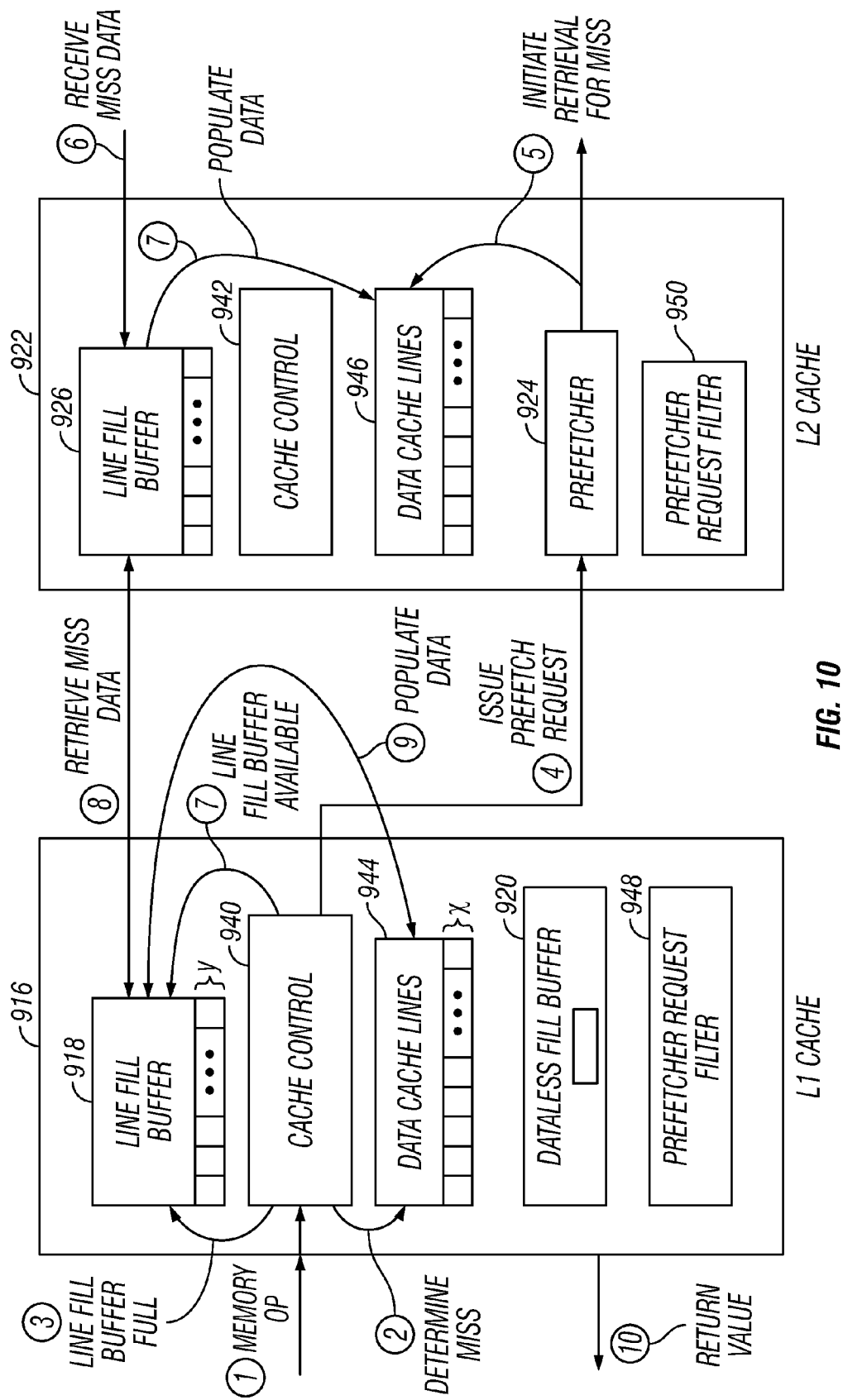
FIG. 10 is an illustration of example operation of system implementing a cache prefetcher, in accordance with embodiments of the present disclosure.

FIG. 10 is an illustration of example operation of system 900, in accordance with embodiments of the present disclosure. While FIG. 10 illustrates example operation of L1 cache 916 with respect to L2 cache 922, the operation shown may be applied to any levels of caches. For example, the operation shown may be repeated by L2 cache 922 with respect to L3 cache 928. Furthermore, additional details about the implementation of cache hierarch 930 are illustrated in FIG. 10.

L1 cache 916 may include cache control 940, implemented by logic, hardware, or other suitable mechanisms to perform the functionality described herein. L2 cache 922 may include cache control 942, implemented by logic, hardware, or other suitable mechanisms to perform the functionality described herein. L1 cache 916 may include data cache lines 944. In one embodiment, there may be x data cache lines while LFB 918 may include y entries, wherein x is greater than y. L2 cache 922 may include data cache lines 946 with a greater number of cache lines than entries in LFB 926. DLFB 920 may include entries for addresses of requested data. In one embodiment, DLFB 920 may include entries as they are allocated in response to miss requests that are not able to be placed within LFB 918.

On one embodiment, L1 cache 916 may include prefetcher request filter 948. L2 cache 922 may include prefetcher request filter 950. As respective ones of L1 cache 916 and L2 cache 922 make prefetch requests of higher cache levels, an indicator of the request may be stored in prefetcher request filter 948 or prefetcher request filter 950 so that multiple such requests may be suppressed.

At (1), a memory operation, such as a read or write, may be received at L1 cache 916 from an associated core 914. L1 cache 916 may determine whether or not the requested data is available within L1 cache 916. If requested data is available for a read request, it may be retrieved from data cache lines 944 returned to the requesting core 914. Furthermore, if an identified data line is available in data cache lines 944 for a request for a write operation, it may be written into data cache. Synchronization of the new data may be performed by cache hierarchy 930 in any suitable manner. Such synchronization may include generating messages that may use LFB 918.

At (2), if the requested data for a read request is unavailable in data lines 944, or if a target data line is unavailable in data cache lines 944 for a write request, then a miss may be determined. It may be determined whether LFB 918 has any available entries in which the miss may be submitted for handling by higher levels of cache hierarchy 930, such as by L2 cache 922. If entries are available in LFB 918, the miss may be placed therein and L1 cache 916 may wait for the results to arrive from L2 cache 922. Once the results arrive, they may be written to data cache lines 944 and any necessary values may be returned to core 914.

At (3), if no entries are available in LFB 918, it may be determined that LFB 918 is full. In one embodiment, L1 cache 916 may initiate a prefetch request for the data while waiting for an entry to be freed from LFB 918. At (4) L1 cache 916 may issue a prefetch request to cache prefetcher 924 as a result of the unavailability of free entries in LFB 918. In another embodiment, L1 cache 916 may continue to try to add the miss request to LFB 918 by waiting for an entry to be freed in LFB 918. The prefetch request may identify the requested information by, for example, memory address or register identifier.

At (5), cache prefetcher 924 may initiate retrieval of data for the miss. Such retrieval may be made by checking data cache lines 946, or initiating retrieval from higher levels of cache hierarchy 930 such as L3 928 or registers 932, memory 934, or other processors 936. Such a retrieval may include causing L2 cache 922 to operate in the manner that L1 cache 916 has operated, wherein contents found in data cache lines 946 may be retrieved and sent to L1 cache 916; however, contents not found within data cache lines 946 may cause L2 cache 922 to place requests within its own LFB 926 or issue its own prefetch requests.

At (6) miss data may be received at L2 cache 922 by, for example, retrieval from data cache lines 946 or receipt of data from L3 cache 928. At (7), the data may be populated, if necessary, into data cache lines 946.

At (7) L1 cache 916 may determine that an entry is available in LFB 918. In one embodiment, L1 cache 916 may have made such a determination while L2 cache 922 was retrieving the information specified in the prefetch request. In another embodiment L1 cache 916 may have made such a determination after L2 cache 922 retrieved the information specified in the prefetch request. L1 cache 916 may populate LFB 918 with the miss request, which may be serviced by L2 cache 922. If the requested data is immediately available in data cache lines 946, it may be retrieved immediately. If the requested data is not yet available in data cache lines 946, it may be retrieved when L2 cache 922 has finished retrieving the data. Nevertheless, the overall latency for retrieval of the data back to L1 cache 916 may have been reduced.

At (8), the miss data may be retrieved from L2 cache 922 through LFB 918. At (9), the retrieved data may be populated into data cache lines 944. At (10), any information or values that are to be returned to core 914 may be returned.

Figure 11:
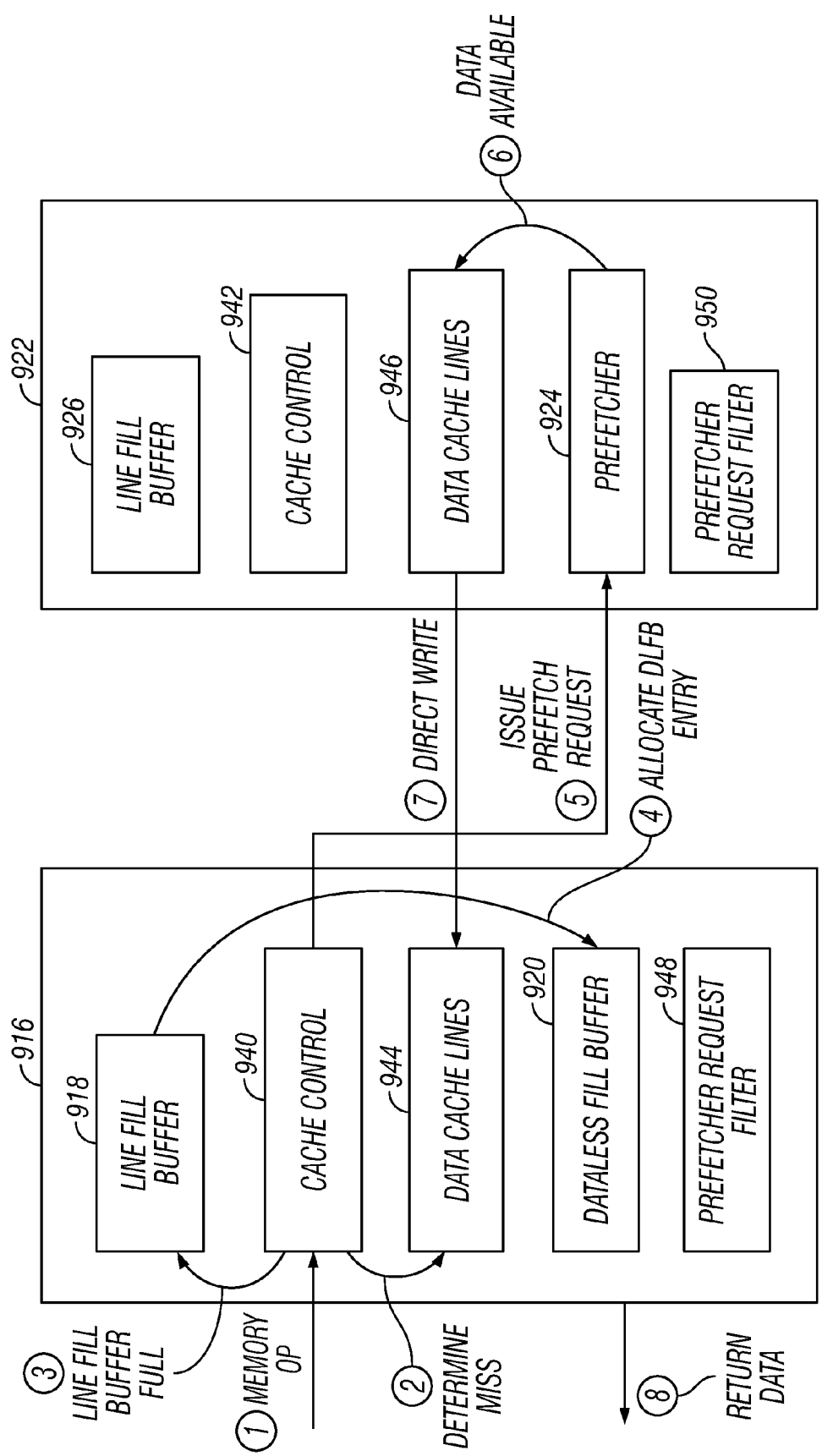
FIG. 11 is an illustration of additional example operation of a system implementing a cache prefetcher and a dataless fill buffer, in accordance with embodiments of the present disclosure.

FIG. 11 is an illustration of additional example operation of system 900 when using a dataless fill buffer, in accordance with embodiments of the present disclosure. While FIG. 11 illustrates example operation of L1 cache 916 with respect to L2 cache 922, the operation shown may be applied to any levels of caches. For example, the operation shown may be repeated by L2 cache 922 with respect to L3 cache 928.

At (1), a memory operation, such as a read or write, may be received at L1 cache 916 from an associated core 914. L1 cache 916 may determine whether or not the requested data is available within L1 cache 916. If requested data is available for a read request, it may be retrieved from data cache lines 944 returned to the requesting core 914. Furthermore, if an identified data line is available in data cache lines 944 for a request for a write operation, it may be written into data cache. Synchronization of the new data may be performed by cache hierarchy 930 in any suitable manner. Such synchronization may include generating messages that may use LFB 918.

At (2), if the requested data for a read request is unavailable in data lines 944, or if a target data line is unavailable in data cache lines 944 for a write request, then a miss may be determined. It may be determined whether LFB 918 has any available entries in which the miss may be submitted for handling by higher levels of cache hierarchy 930, such as by L2 cache 922. If entries are available in LFB 918, the miss may be placed therein and L1 cache 916 may wait for the results to arrive from L2 cache 922. Once the results arrive, they may be written to data cache lines 944 and any necessary values may be returned to core 914. At (3), if no entries are available in LFB 918, it may be determined that LFB 918 is full. In one embodiment, L1 cache 916 may use DLFB 920 to facilitate a direct write of data, if available, from data cache lines 946 to data cache lines 944 without using LFB 918.

In one embodiment, at (4) L1 cache 916 may allocate the address or identifier of the missed data in DLFB 920. L1 cache 916 may make such an allocation and a prefetch request for the data while waiting for an entry to be freed from LFB 918. In another embodiment, DLFB might not be allocated with space for the requested data as would be found in an entry in LFB 918. At (5), a prefetch request for the data may be issued based upon the contents of DLFB 920 to cache prefetcher 924.

In one embodiment, at (6), if the data is available from data cache lines 946, then the data may be retrieved. At (7), the data may be directly written to data cache lines 944. At (8), any information or values that are to be returned to core 914 may be returned.

In one embodiment, if the data is not available from data cache lines 946, then the entry in DLFB 920 may be deallocated. Cache prefetcher 924 may begin retrieval by, for example, placing a miss request in LFB 926 or issuing its own prefetch request of L3 928. Furthermore, L1 cache 916 and L2 cache 922 may perform as shown in FIG. 10. For example, L1 cache 916 may continue to attempt to write the miss request in LFB 918 and L2 cache 922 may, in parallel, begin retrieval of the requested data. Once the requested data is sent from L2 cache 922 to LFB 918, the data may be written to data cache lines 944 and returned, if necessary, to core 914.

Figure 12:
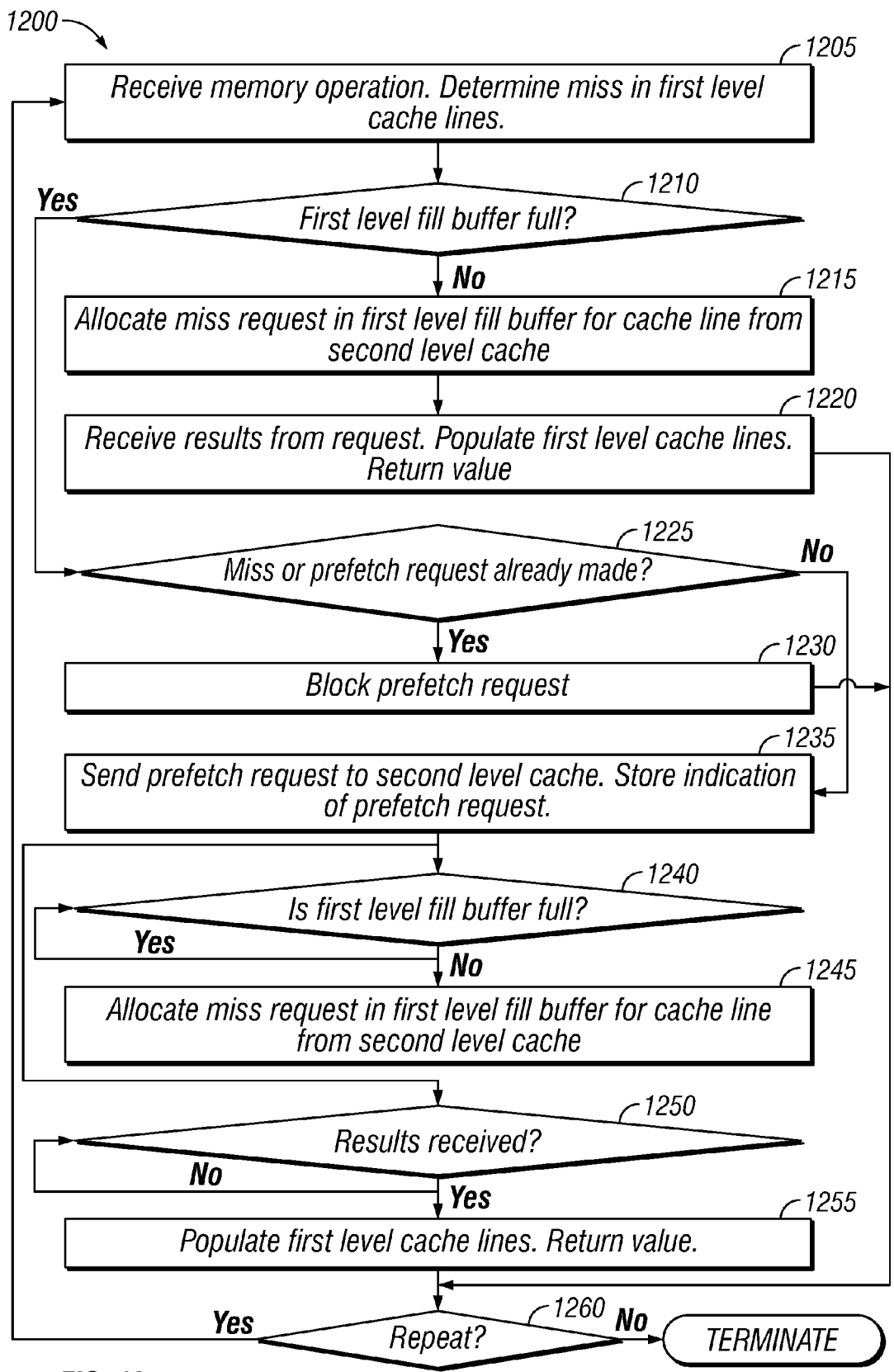
FIG. 12 is a flowchart of an example embodiment of a method for cache prefetching, in accordance with embodiments of the present disclosure.

FIG. 12 is a flowchart of an example embodiment of a method 1200 for cache prefetching, in accordance with embodiments of the present disclosure. Method 1300 may illustrate operations performed by, for example, system 900 and processor 904. More specifically, method 1200 may illustrate operations performed by adjacent levels of a cache hierarchy, such as cache hierarchy 930. Herein, examples are given with respect to a lower level cache and a higher level cache, such as L1 cache 916 and L2 cache 922. However, any suitable levels of cache may perform method 1200. In addition, parts of method 1200 may be performed by a cache prefetcher such as cache prefetcher 924. Method 1200 may begin at any suitable point and may execute in any suitable order. In one embodiment, method 1200 may begin at 1205.

At 1205, a memory operation, such as a read or write, may be received. The memory operation may be received at a first, lower cache level from, for example, a core such as core 914. The lower level cache may include, for example, L1 cache 916. The memory operation may request access to data that is not found within the lower cache's data cache lines. The memory operation may thus generate a miss. The first, lower cache level may determine the miss. In another example, the memory operation may be received at L2 cache 922 as a miss from L1 cache 916.

At 1210, the first, lower level cache may determine whether its fill buffer is full. For example, L1 cache 916 may determine that LFB 918 is full and no entries are available to service the miss based on the memory request from core 914. In another example, L2 cache 922 may determine that LFB 926 is full and no entries are available to service the miss received from L1 cache 916. If the fill buffer is full, method 1200 may proceed to 1225. Otherwise, method 1200 may proceed to 1215.

At 1215, the first, lower level cache may allocate a miss request in a free entry in the fill buffer for the missing cache line. The request may be made for a second, higher level cache. For example, L1 cache 916 may allocate a miss request in LFB 918 to be serviced by L2 cache 922. In another example, L2 cache 922 may allocate a miss request in LFB 926 to be serviced by L2 cache 928.

At 1220, results may be received at the first, lower level cache from the second, higher level cache. The data cache lines of the first, lower level may be populated with the results. Any necessary values may be returned to the source of the original memory operation. The associated entry in the fill buffer may be freed. For example, L1 cache 916 may receive results from L2 cache 922, populate the results into data cache lines 944, return necessary values to core 914, and free the entry from LFB 918. In another example, L2 cache 922 may receive results from L3 cache 928, populate the results into data cache lines 946, send necessary messages to LFB 918, and free the entry from LFB 926. Method 1200 may proceed to 1260.

At 1225, it may be determined whether a previous miss or prefetch request has been made for the same information needed by the memory operation received in 1205. Such a determination may be made by, for example, checking the status of a queue, filter, or other tracking mechanism such as prefetcher request filter 948 or prefetcher request filter 950. If so, method 1200 may proceed to 1230. If not, method 1200 may proceed to 1235.

At 1230, the miss or prefetch request may be determined to be duplicative and may be blocked. Method 1200 may proceed to 1260.

At 1235, a prefetch request may be sent to the second, higher level cache. The prefetch request may be sent to a prefetcher. Furthermore, an indication of the prefetch request or of the miss may be stored in a queue, filter, or other tracking mechanism. For example, L1 cache 916 may issue a prefetch request to cache prefetcher 924 and store an indication of the request in prefetcher request filter 948. In another example, L2 cache 922 may issue a prefetch request to a cache prefetcher of L3 cache 928 and store an indication of the request in prefetcher request filter 950. In one embodiment, method 1200 may proceed to 1240 and to 1250 in parallel. 1240 and 1250 may be performed by the first, lower level cache while the second, higher level cache handles the prefetch request. In various embodiments, the prefetch request may in turn be handled as a memory operation as described in, for example, a recursive instance of method 1200 or of method 1300 of FIG. 13.

At 1240, it may be determined whether the first, lower level cache is full, without a free entry in its LFB. If so, method 1200 may repeat 1240. If not, method 1200 may proceed to 1245. For example, L1 cache 916 may determine whether LFB 918 has any free entries and, if not, may continue to check LFB 918 for free entries. In another example, L2 cache 922 may determine whether LFB 926 has any free entries and, if not, may continue to check LFB 926 for free entries. At 1245, the first, lower level cache may allocate the miss request into its LFB to request data from the second, higher level cache. For example, L1 cache 916 may populate LFB 918 with a miss request for the data requested by core 914 to be serviced in turn by L2 cache 922. In another example, L2 cache 922 may populate LFB 926 with a miss request for the data requested by L1 cache 916 to be serviced in turn by L3 cache 928.

At 1250, it may be determined whether any results have been received from the second, higher cache level. If not, method 1200 may continue to check for such results. If so, method 1200 may proceed to 1255. For example, L1 cache 916 may check LFB 918 to determine whether any results have been returned from L2 cache 922. In another example, L2 cache 922 may check LFB 926 to determine whether any results have been returned from L3 cache 928.

At 1255, the data cache lines of the first, lower level cache may be populated with the results returned from the second, higher level cache. Any necessary values may be returned to the maker of the request of 1205. For example, L1 cache 916 may populate data cache lines 944 with values received from L2 cache 922 and return any results to core 914. In another example, L2 cache 922 may populate data cache lines 946 with values received from L3 cache 928 and inform L1 cache 916.

At 1260, it may be determined whether method 1200 should repeat. If so, method 1200 may return to 1205. If not, method 1200 may terminate.

Figure 13:
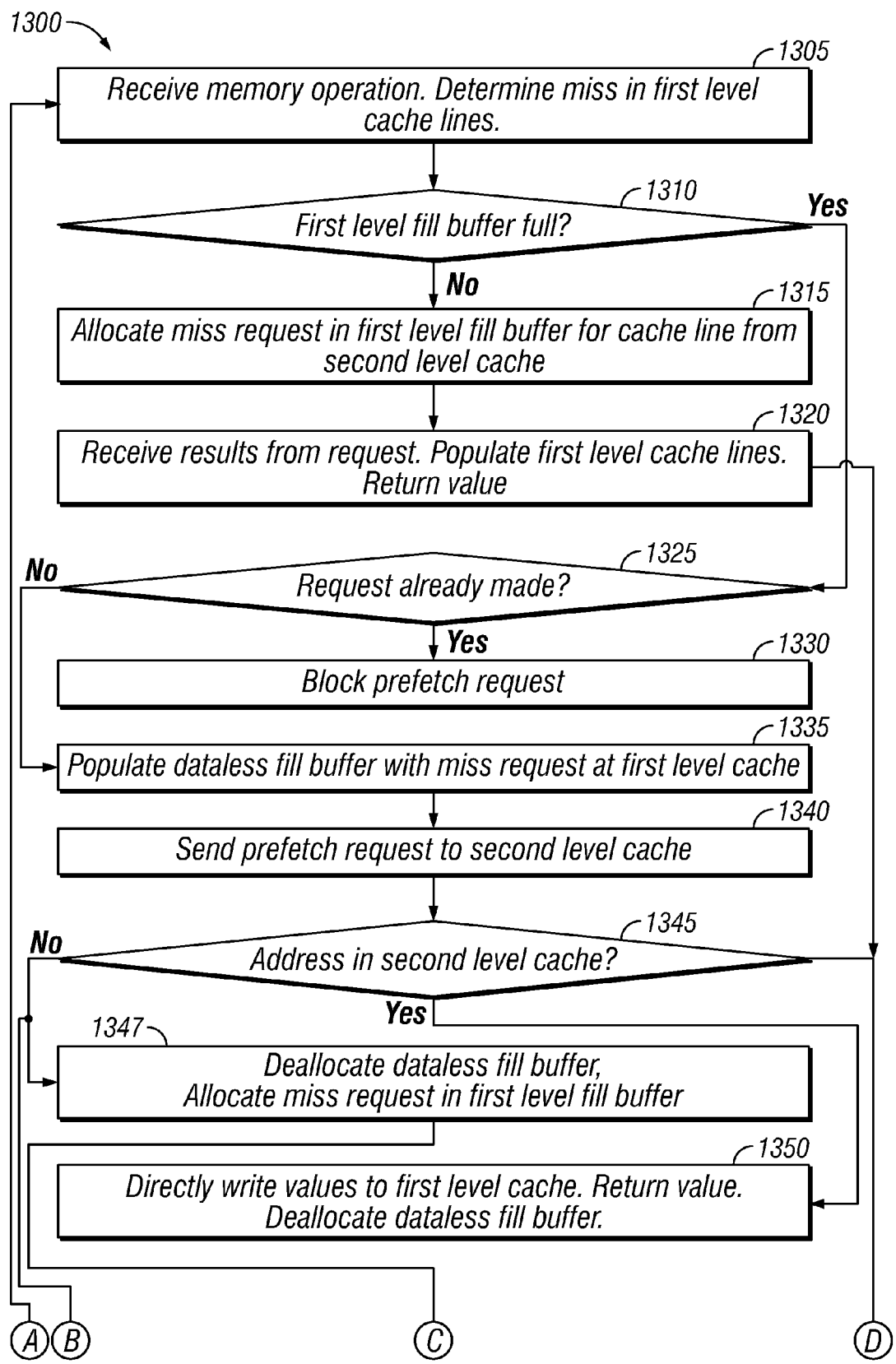
FIG. 13 is a flowchart of an example embodiment of a method for cache prefetching with a dataless fill buffer, in accordance with embodiments of the present disclosure.
Figure 13:
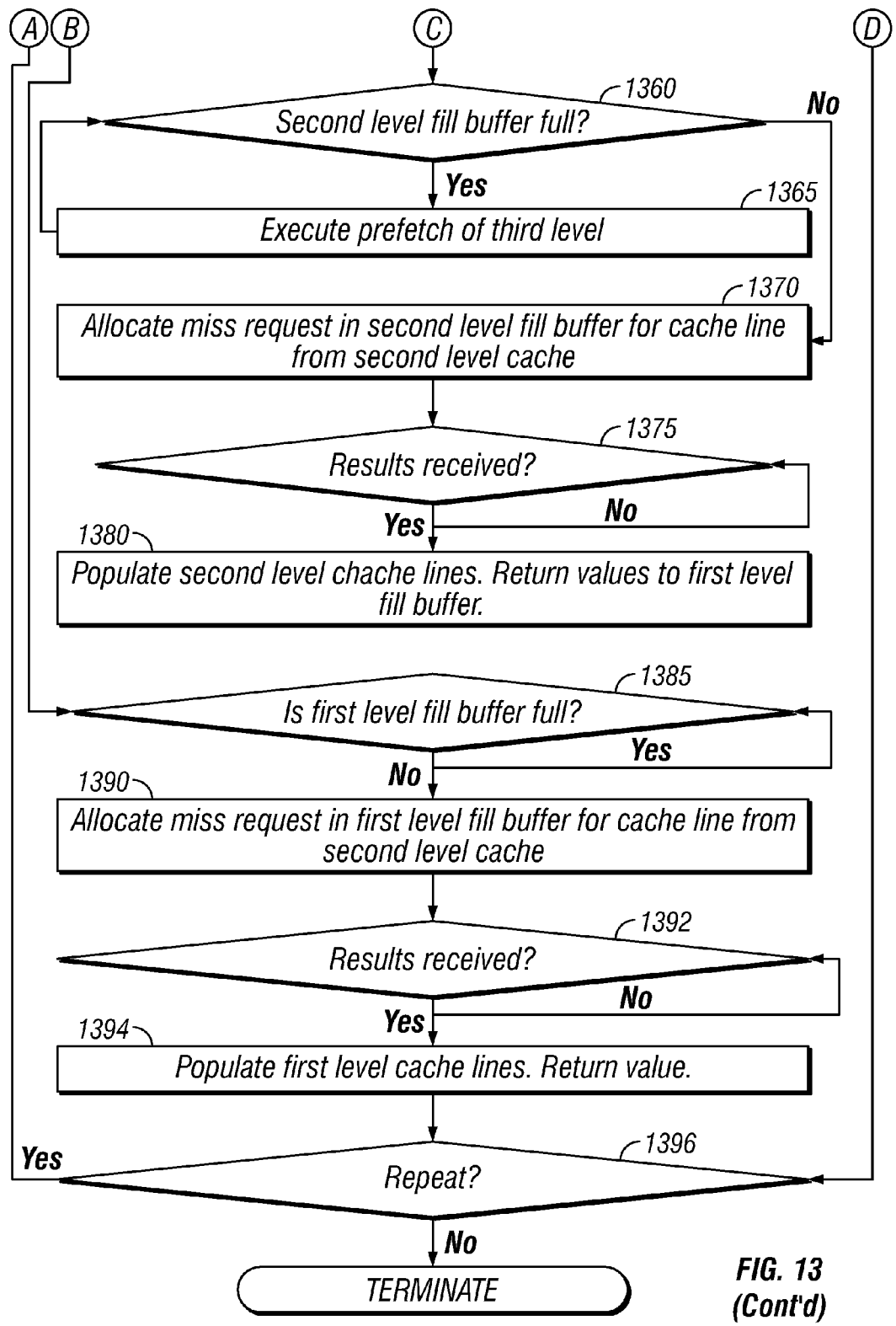

FIG. 13 is a flowchart of an example embodiment of a method 1300 for cache prefetching with a dataless fill buffer, in accordance with embodiments of the present disclosure. Method 1300 may illustrate operations performed by, for example, system 900 and processor 904. More specifically, method 1300 may illustrate operations performed by adjacent levels of a cache hierarchy, such as cache hierarchy 930. Herein, examples are given with respect to a lower level cache and a higher level cache, such as L1 cache 916 and L2 cache 922. However, any suitable levels of cache may perform method 1300. In addition, parts of method 1300 may be performed by a cache prefetcher such as cache prefetcher 924. Method 1300 may begin at any suitable point and may execute in any suitable order. In one embodiment, method 1300 may begin at 1305.

At 1305, a memory operation, such as a read or write, may be received. The memory operation may be received at a first, lower cache level from, for example, a core such as core 914. The lower level cache may include, for example, L1 cache 916. The memory operation may request access to data that is not found within the lower cache's data cache lines. The memory operation may thus generate a miss. The first, lower cache level may determine the miss. In another example, the memory operation may be received at L2 cache 922 as a miss from L1 cache 916.

At 1310, the first, lower level cache may determine whether its fill buffer is full. For example, L1 cache 916 may determine that LFB 918 is full and no entries are available to service the miss based on the memory request from core 914. In another example, L2 cache 922 may determine that LFB 926 is full and no entries are available to service the miss received from L1 cache 916. If the fill buffer is full, method 1300 may proceed to 1325. Otherwise, method 1300 may proceed to 1315.

At 1315, the first, lower level cache may allocate a miss request in a free entry in the fill buffer for the missing cache line. The request may be made for a second, higher level cache. For example, L1 cache 916 may allocate a miss request in LFB 918 to be serviced by L2 cache 922. In another example, L2 cache 922 may allocate a miss request in LFB 926 to be serviced by L2 cache 928.

At 1320, results may be received at the first, lower level cache from the second, higher level cache. The data cache lines of the first, lower level may be populated with the results. Any necessary values may be returned to the source of the original memory operation. The associated entry in the fill buffer may be freed. For example, L1 cache 916 may receive results from L2 cache 922, populate the results into data cache lines 944, return necessary values to core 914, and free the entry from LFB 918. In another example, L2 cache 922 may receive results from L3 cache 928, populate the results into data cache lines 946, send necessary messages to LFB 918, and free the entry from LFB 926. Method 1300 may proceed to 1396.

At 1325, it may be determined whether a previous miss or prefetch request has been made for the same information needed by the memory operation received in 1305. Such a determination may be made by, for example, checking the status of a queue, filter, or other tracking mechanism such as prefetcher request filter 948 or prefetcher request filter 950. If so, method 1300 may proceed to 1330. If not, method 1300 may proceed to 1335.

At 1330, the miss or prefetch request may be determined to be duplicative and may be blocked. Method 1300 may proceed to 1396.

At 1335, in one embodiment a DLFB at the first, lower cache level may be allocated, or an entry within a DLFB at the first, lower cache level may be populated. The DLFB may be populated with an address or identifier of the requested data associated with the miss. In another embodiment, the DLFB might not include space for the actual data to be stored to populate data cache lines. For example, L1 cache 916 may allocate an entry for the miss from the memory operation in DLFB 920, or may allocate DLFB 920.

At 1340, a prefetch request may be sent to the second, higher level cache. The prefetch request may be sent to a prefetcher. Furthermore, an indication of the prefetch request or of the miss may be stored in a queue, filter, or other tracking mechanism. For example, L1 cache 916 may issue a prefetch request to cache prefetcher 924 and store an indication of the request in prefetcher request filter 948. In another example, L2 cache 922 may issue a prefetch request to a cache prefetcher of L3 cache 928 and store an indication of the request in prefetcher request filter 950.

At 1345, it may be determined whether the requested data, identified by the address or other identifier, is within the second, higher level cache. For example, cache prefetcher 924 may determine whether the miss request from L1 cache 916 may be serviced by data cache lines 946. In another example, a cache prefetcher of L3 cache 928 may determine whether a miss request from L2 cache 922 may be serviced by the data cache lines of L3 cache 928. If the requested data is within the second, higher level cache, method 1300 may proceed to 1350. Otherwise, in one embodiment method 1300 may proceed to 1347.

At 1347, in one embodiment the previously populated entry in the DLFB or the previously allocated DLFB (from 1335) of the first, lower level cache may be deallocated. For example, L1 cache 916 may deallocate the entry for the miss from the memory operation in DLFB 920, or may allocate DLFB 920. In another embodiment, the first, lower level cache may allocate a miss request in a free entry in the fill buffer for the missing cache line. The request may be made for a second, higher level cache. For example, L1 cache 916 may allocate a miss request in LFB 918 to be serviced by L2 cache 922. In another example, L2 cache 922 may allocate a miss request in LFB 926 to be serviced by L2 cache 928. Method 1300 may proceed to 1360 and 1385 in parallel. 1360 may be performed by the second, higher level cache and 1385 may be performed by the first, lower level cache. For example, 1360 may be performed by L2 cache 922 and 1385 may be performed by L1 cache 916. In another example, 1360 may be performed by L3 cache 928 and 1385 may be performed by L2 cache 922.

At 1350, if the requested data is within the second, higher level cache and direct writes to the first, lower level cache data lines is supported, then the values with the second, higher level cache may be written directly to the data cache lines of the first, lower level. The entry in the DLFB may be deallocated. For example, L2 cache 922 may write the values from data cache lines 946 directly to data cache lines 944. In another example, L3 cache 928 may write the values from its data cache lines directly to data cache lines. In one embodiment, a DLFB might not be available in L2 cache 922. In such an embodiment, fulfillment of the request from L1 cache 916 at L2 cache 922 may be performed by method 1200 of FIG. 12. Method 1300 may proceed to 1396.

At 1360, it may be determined whether the second, higher level cache is full, without available entries within its LFB. If so, method 1300 may proceed to 1365. If not, method 1300 may proceed to 1370.

At 1365, a prefetch request may be issued by the second, higher level cache for the requested data to a third, even-higher level cache prefetcher, if available. In various embodiments, the prefetch request may in turn be handled as a memory operation as described in, for example, a recursive instance of method 1300 or of method 1200 of FIG. 12. For example, L2 cache 922 may issue a prefetch request to a cache prefetcher of L3 cache 928. In another example, L3 cache 928 may issue a prefetch request for a cache prefetcher above it within cache hierarchy 930. In yet another example, wherein no prefetcher is available above L3 cache 928, no prefetch request might be made and L3 cache 928 may handle the request as a typical miss. Furthermore, at 1365, the prefetch request may be issued after determining that no pending prefetch requests for the same information have already been issued. If such prefetch requests have already been issued, then the prefetch request may be dropped. Method 1300 may return to 1360.

At 1370, a free space in the fill buffer of the second, higher cache level may be free and a miss request may be allocated therein. The miss request may be a request for service by a third, even-higher level cache level. For example, L2 cache 922 may allocate a request in LFB 926 to be fulfilled by L3 928. In another example, L3 cache 928 may allocate a request in its LFB 926 to retrieve results from registers 932, memory 934, or other processors 936.

At 1375, it may be determined whether results have been received at the second, higher level cache. If not, method 1300 may repeat 1375. If so, method 1300 may proceed to 1380. For example, L2 cache 922 may query LFB 926 to determine whether results have been returned from L3 cache 928. In another example, L3 cache 928 may query its LFB to determine whether results have been retrieved from registers 932, memory 934, or other processors 936.

At 1380, the retrieved results may be used to populate the data cache lines of the second, higher level cache. Furthermore, values may be returned to the LFB of the first, lower level cache. For example, L2 cache 922 may populate data cache lines 946 and return the results to LFB 918. In another example, L3 cache 928 may populate its data cache lines and return the results to LFB 926.

At 1385, it may be determined whether the first, lower level cache is full, without has a free entry in its LFB. If so, method 1300 may repeat 1385. If not, method 1300 may proceed to 1390. For example, L1 cache 916 may determine whether LFB 918 has any free entries and, if not, may continue to check LFB 918 for free entries. In another example, L2 cache 922 may determine whether LFB 926 has any free entries and, if not, may continue to check LFB 926 for free entries.

At 1390, the first, lower level cache may allocate the miss request into its LFB to request data from the second, higher level cache. For example, L1 cache 916 may populate LFB 918 with a miss request for the data requested by core 914 to be serviced in turn by L2 cache 922. In another example, L2 cache 922 may populate LFB 926 with a miss request for the data requested by L1 cache 916 to be serviced in turn by L3 cache 928.

At 1392, it may be determined whether any results have been received from the second, higher cache level. If not, method 1300 may continue to check for such results. If so, method 1300 may proceed to 1394. For example, L1 cache 916 may check LFB 918 to determine whether any results have been returned from L2 cache 922. In another example, L2 cache 922 may check LFB 926 to determine whether any results have been returned from L3 cache 928.

At 1394, the data cache lines of the first, lower level cache may be populated with the results returned from the second, higher level cache. Any necessary values may be returned to the maker of the request of 1305. For example, L1 cache 916 may populate data cache lines 944 with values received from L2 cache 922 and return any results to core 914. In another example, L2 cache 922 may populate data cache lines 946 with values received from L3 cache 928 and inform L1 cache 916.

At 1396, it may be determined whether method 1300 should repeat. If so, method 1300 may return to 1305. If not, method 1300 may terminate.

Methods 1200 and 1300 may be initiated by any suitable criteria. Furthermore, although methods 1200 and 1300 describe an operation of particular elements, methods 1200 and 1300 may be performed by any suitable combination or type of elements. For example, methods 1200 and 1300 may be implemented by the elements illustrated in FIGS. 1-11 or any other system operable to implement methods 1200 and 1300. As such, the preferred initialization point for methods 1200 and 1300 and the order of the elements comprising them may depend on the implementation chosen. In some embodiments, some elements may be optionally omitted, reorganized, repeated, or combined. Furthermore, methods 1200 and 1300 may be performed fully or in part in parallel with each other.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system may include any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part-on and part-off processor.

Thus, techniques for performing one or more instructions according to at least one embodiment are disclosed. While certain exemplary embodiments have been described and shown in the accompanying drawings, it is to be understood that such embodiments are merely illustrative of and not restrictive on other embodiments, and that such embodiments not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor, comprising:
   a cache hierarchy including a lower level cache and a higher level cache;
   an execution unit including circuitry to issue a memory operation to access the cache hierarchy;
   wherein the lower level cache includes circuitry to:
      determine that a requested cache line of the memory operation is unavailable in the lower level cache;
      determine that a line fill buffer of the lower level cache is full, the line fill buffer to forward miss requests to the higher level cache; and
      initiate prefetching of the requested cache line from the higher level cache based upon the determination that the line fill buffer of the lower level cache is full;
      populate a dataless fill buffer with an entry, wherein:
         the line fill buffer includes entries with storage for contents of cache lines;
         the dataless fill buffer includes an identifier of the requested cache line; and
         the dataless fill buffer excludes storage for contents of the requested cache line; and;
      use the identifier of the requested cache line to initiate the prefetching.

2. The processor of claim 1, wherein the higher level cache includes circuitry to:
   determine that the requested cache line is available in the higher level cache; and
   write the requested cache line to the lower level cache by bypassing the line fill buffer of the lower level cache.

3. The processor of claim 1, wherein the lower level cache further includes circuitry to:
   postpone adding a miss request for the requested cache line to the line fill buffer based upon populating the dataless fill buffer; and
   cancel the miss request based upon a determination by the higher level cache that the requested cache line is available in the higher level cache.

4. The processor of claim 1, wherein the lower level cache further includes circuitry to:
   postpone adding a miss request for the requested cache line to the line fill buffer based upon populating the dataless fill buffer; and
   add the miss request for the requested cache line to the line fill buffer based upon a determination by the higher level cache that the requested cache line is unavailable in the higher level cache.

5. The processor of claim 1, wherein the lower level cache further includes circuitry to:
   after determining that the line buffer of the lower level cache is full, determine at a later time that the line buffer has a free entry;
   based upon the determination at the later time that the line buffer has the free entry, add a miss request for the requested cache line to the free entry of the line fill buffer after prefetching is initiated.

6. The processor of claim 5, wherein the higher level cache further includes circuitry to:
  determine a location of the requested cache line based upon the initialization of prefetching;
  retrieve the requested cache line based upon the determination of the location; and
  provide the requested cache line to the lower level cache based upon the miss request added to the free entry of the line fill buffer.

7. A system, comprising:
  a cache hierarchy including a lower level cache and a higher level cache;
  an execution unit including circuitry to issue a memory operation to access the cache hierarchy;
  wherein the lower level cache includes circuitry to:
    determine that a requested cache line of the memory operation is unavailable in the lower level cache;
    determine that a line fill buffer of the lower level cache is full, the line fill buffer to forward miss requests to the higher level cache; and
    initiate prefetching of the requested cache line from the higher level cache based upon the determination that the line fill buffer of the lower level cache is full;
    populate a dataless fill buffer with an entry, wherein:
      the line fill buffer includes entries with storage for contents of cache lines;
      the dataless fill buffer includes an identifier of the requested cache line; and
      the dataless fill buffer excludes storage for contents of the requested cache line; and;
    use the identifier of the requested cache line to initiate the prefetching.

8. The system of claim 7, wherein the higher level cache includes circuitry to:
  determine that the requested cache line is available in the higher level cache; and
  write the requested cache line to the lower level cache by bypassing the line fill buffer of the lower level cache.

9. The system of claim 7, wherein the lower level cache further includes circuitry to:
  postpone adding a miss request for the requested cache line to the line fill buffer based upon populating the dataless fill buffer; and
  cancel the miss request based upon a determination by the higher level cache that the requested cache line is available in the higher level cache.

10. The system of claim 7, wherein the lower level cache further includes circuitry to:
  postpone adding a miss request for the requested cache line to the line fill buffer based upon populating the dataless fill buffer; and
  add the miss request for the requested cache line to the line fill buffer based upon a determination by the higher level cache that the requested cache line is unavailable in the higher level cache.

11. The system of claim 7, wherein the lower level cache further includes circuitry to:
  after determining that the line buffer of the lower level cache is full, determine at a later time that the line buffer has a free entry;
  based upon the determination at the later time that the line buffer has the free entry, add a miss request for the requested cache line to the free entry of the line fill buffer after prefetching is initiated.

12. The system of claim 11, wherein the higher level cache further includes circuitry to:
  determine a location of the requested cache line based upon the initialization of prefetching;
  retrieve the requested cache line based upon the determination of the location; and
  provide the requested cache line to the lower level cache based upon the miss request added to the free entry of the line fill buffer.

13. A method for caching memory access in a processor, comprising:
  issuing a memory operation to a cache hierarchy, the cache hierarchy including a lower level cache and a higher level cache;
  determining that a requested cache line of the memory operation is unavailable in the lower level cache;
  determining that a line fill buffer of the lower level cache is full, the line fill buffer to forward miss requests to the higher level cache; and
  initiating prefetching of the requested cache line from the higher level cache based upon the determination that the line fill buffer of the lower level cache is full;
  populating a dataless fill buffer with an entry, wherein:
    the line fill buffer includes entries with storage for contents of cache lines;
    the dataless fill buffer includes an identifier of the requested cache line; and
    the dataless fill buffer excludes storage for contents of the requested cache line; and
  using the identifier of the requested cache line to initiate the prefetching.

14. The method of claim 13, further comprising:
  postponing adding a miss request for the requested cache line to the line fill buffer based upon populating the dataless fill buffer; and
  cancelling the miss request based upon a determination by the higher level cache that the requested cache line is available in the higher level cache.

15. The method of claim 13, further comprising:
  postponing adding a miss request for the requested cache line to the line fill buffer based upon populating the dataless fill buffer; and
  adding the miss request for the requested cache line to the line fill buffer based upon a determination by the higher level cache that the requested cache line is unavailable in the higher level cache.

16. The method of claim 13, further comprising:
  after determining that the line buffer of the lower level cache is full, determining at a later time that the line buffer has a free entry;
  based upon the determination at the later time that the line buffer has the free entry, adding a miss request for the requested cache line to the free entry of the line fill buffer after prefetching is initiated.

17. The method of claim 16, further comprising:
  determining a location of the requested cache line based upon the initialization of prefetching;
  retrieving the requested cache line based upon the determination of the location; and
  providing the requested cache line to the lower level cache based upon the miss request added to the free entry of the line fill buffer.

* * * * *